(12) United States Patent
Yang et al.

(10) Patent No.: US 6,781,819 B2
(45) Date of Patent: Aug. 24, 2004

(54) ATTACHABLE/DETACHABLE KEYBOARD APPARATUS OF PORTABLE COMPUTER SYSTEM

(75) Inventors: Myeong Kyoo Yang, Suweon-si (KR); Joung Sea Park, Seoul (KR); Dong Joon Choi, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/320,667

(22) Filed: Dec. 17, 2002

(65) Prior Publication Data

US 2004/0042159 A1 Mar. 4, 2004

(30) Foreign Application Priority Data

Aug. 29, 2002 (KR) ................................ 10-2002-0051609

(51) Int. Cl.[7] ................................................. G06F 1/16
(52) U.S. Cl. ........................ 361/680; 400/489; 345/905; 341/22
(58) Field of Search ................................. 361/679–687, 361/724–727; 341/22; 400/489, 682, 691–693, 82, 88; 345/168–169, 905

(56) References Cited

U.S. PATENT DOCUMENTS

| 5,335,142 | A | | 8/1994 | Anderson | 361/681 |
| 6,108,200 | A | | 8/2000 | Fullerton | 361/686 |
| 6,275,376 | B1 | | 8/2001 | Moon | 361/683 |
| 6,614,649 | B1 | * | 9/2003 | Wang | 361/680 |
| 2003/0103035 | A1 | * | 6/2003 | Watanabe et al. | 345/156 |
| 2003/0112159 | A1 | * | 6/2003 | Watanabe et al. | 341/22 |

* cited by examiner

Primary Examiner—Hung Van Duong
(74) Attorney, Agent, or Firm—Fleshner & Kim, LLP

(57) ABSTRACT

An attachable/detachable keyboard apparatus is provided for a portable multi-type computer system. The keyboard apparatus can be secured to an upper surface of main body of the computer system and selectively enable users to input data when the computer (e.g., web pad) is turned on. The keyboard apparatus can be used for a portable multi-type computer with web pad function and notebook personal computer in view that the keyboard apparatus can be easily attached to or detached from the main body of the computer system, thereby helping users to carry the computer more conveniently.

20 Claims, 22 Drawing Sheets

FIG. 5
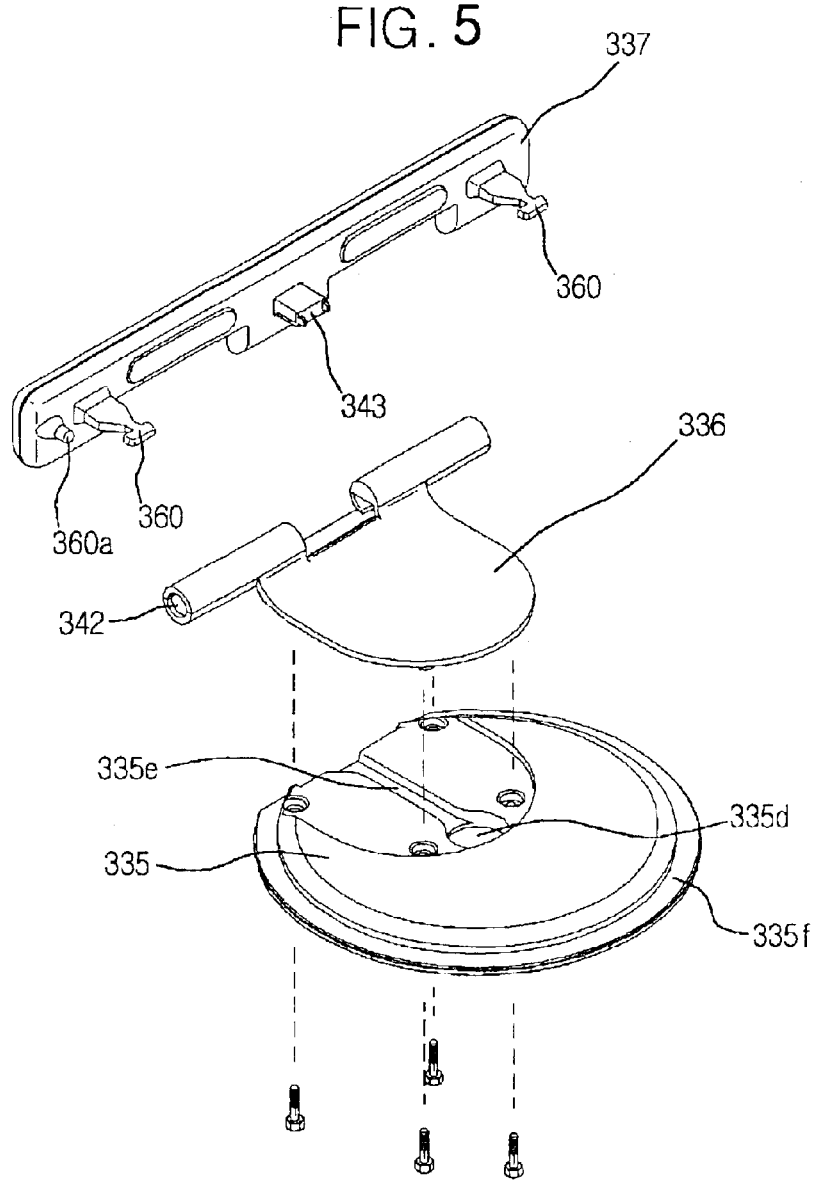
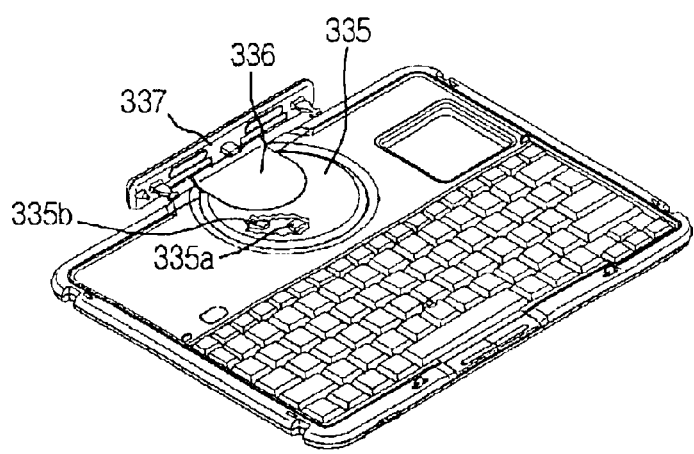

FIG. 8A
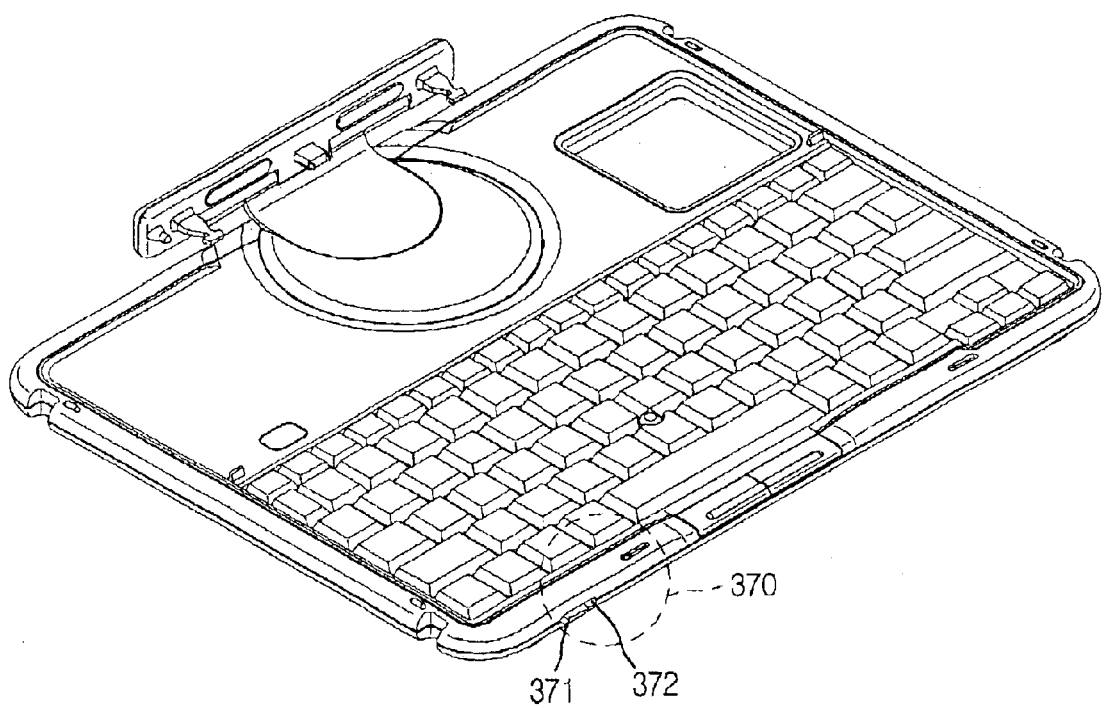
(Before being connected to main body)
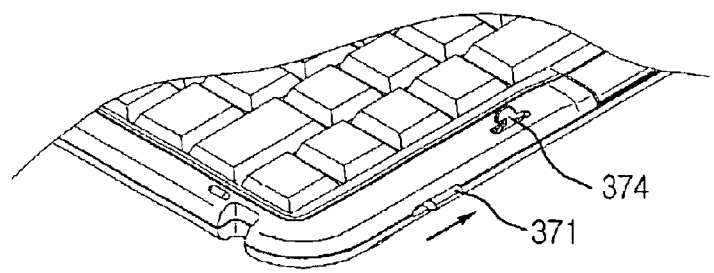
(After being connected to main body)

Before locking keyboard opening/closing button

After locking keyboard opening/closing button

FIG.12
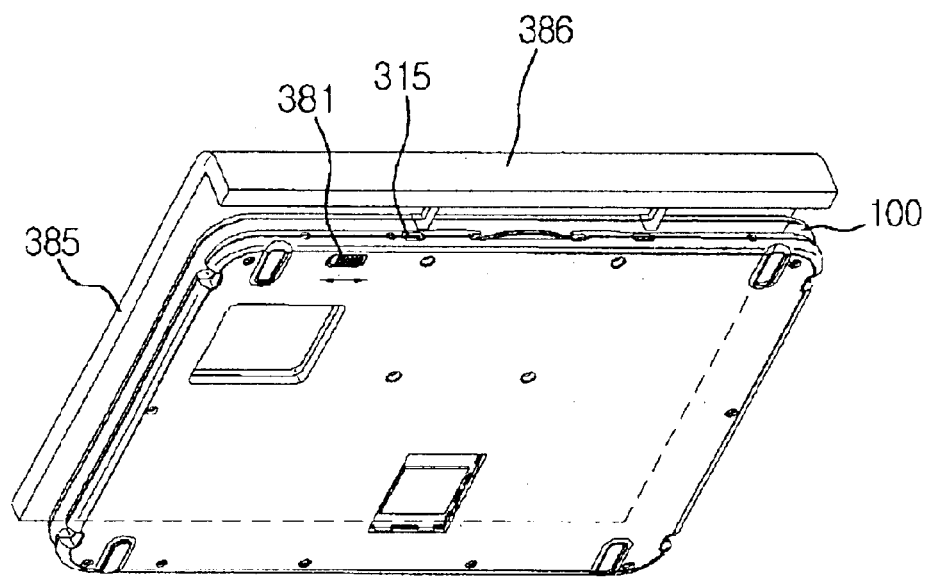
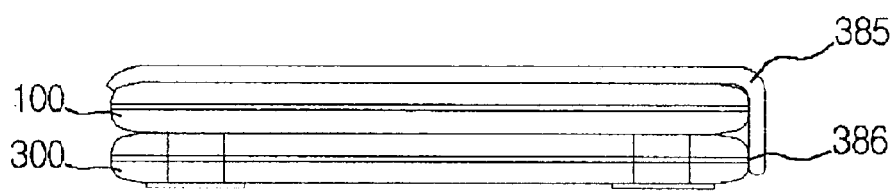
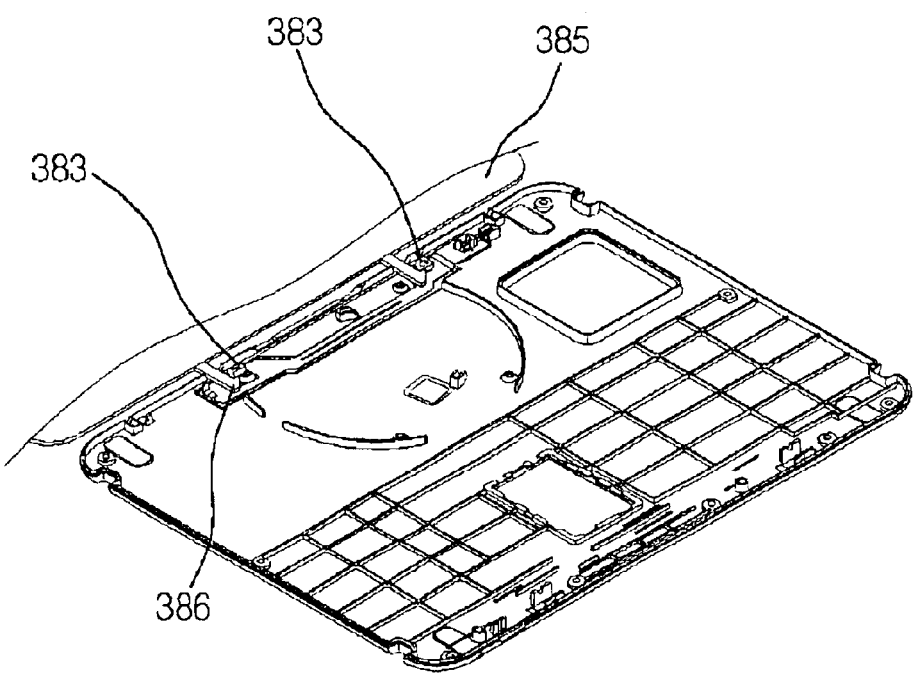

FIG. 13A
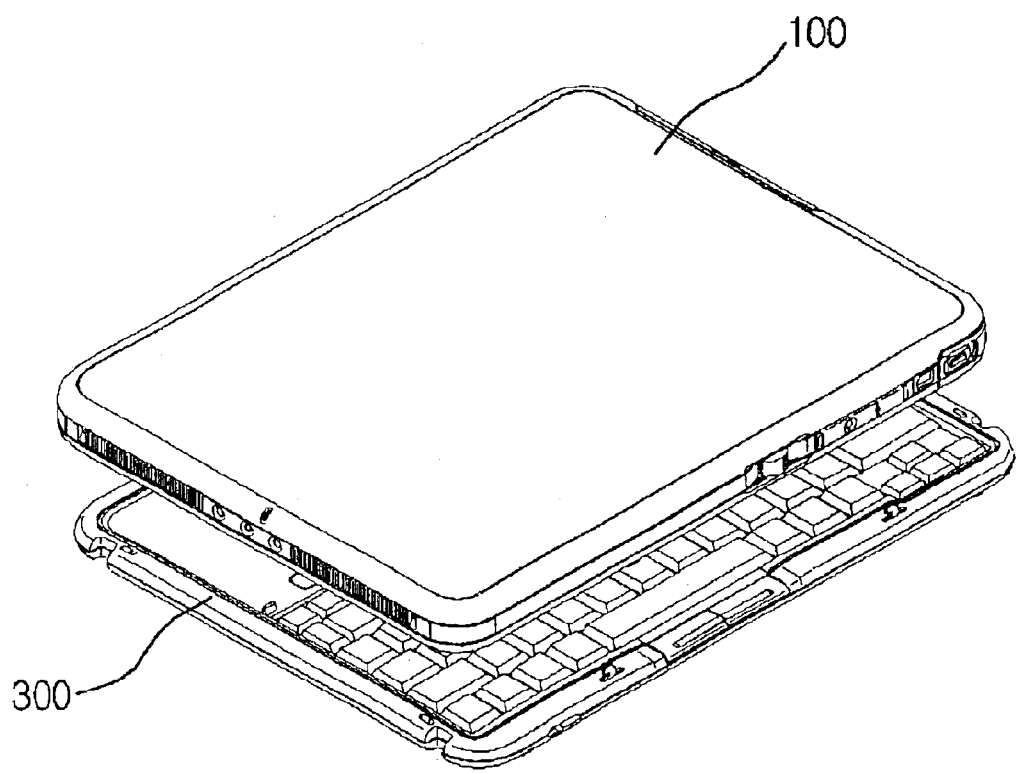
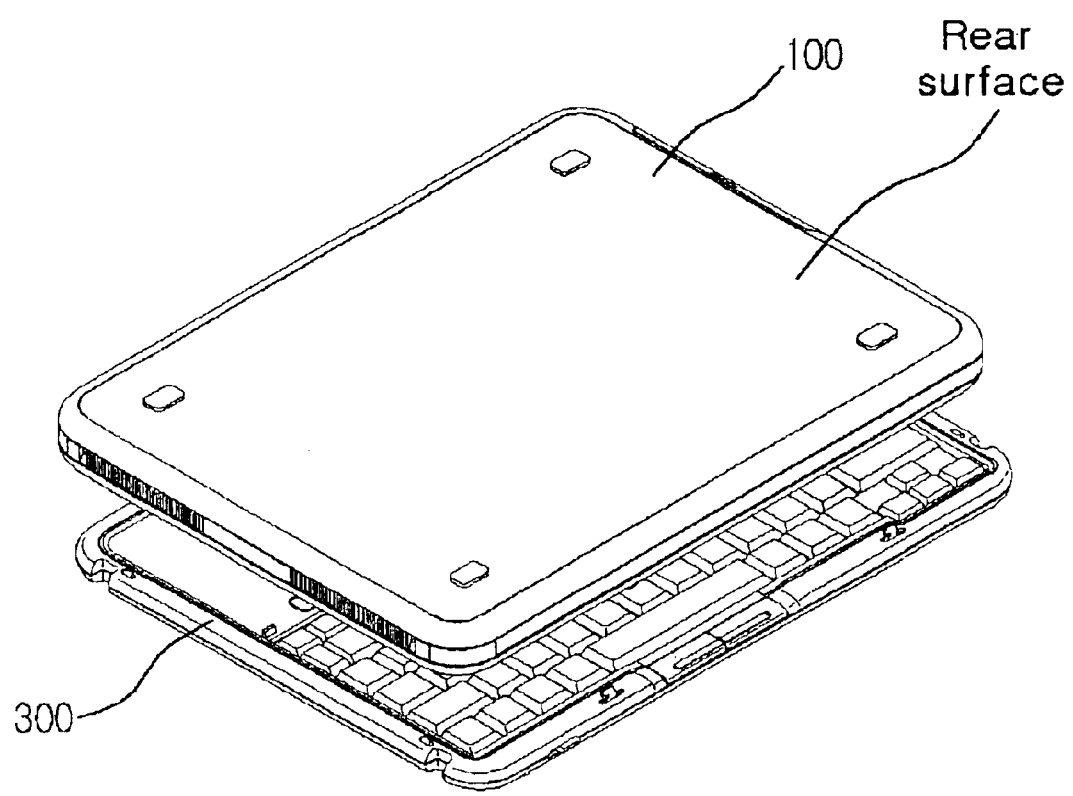

ATTACHABLE/DETACHABLE KEYBOARD APPARATUS OF PORTABLE COMPUTER SYSTEM

BACKGROUND OF THE INVENTION

1. Field of the Invention

The present invention relates to a portable computer system.

2. Background of the Related Art

As more business is being handled outside the office, people prefer a notebook personal computer (PC) to a desktop PC or a personal digital assistant (PDA) because the notebook PCs are more convenient to carry out and operate outside of the office with high functionality.

A related art notebook PC is one main body including a system with keyboard to input text or data attached to the main body. Although the notebook PC can be carried anywhere, its weight is rather heavy and it is occasionally inconvenient to use. To reduce the total weight, a floppy disk drive (FDD) or an optical disk drive was separated from the main body, and connected to the main body only if necessary for use.

Related art personal digital assistances (PDAs) allow one to input data by using a stylus pen to tap a virtual keyboard on a display or actually write on the display. However, tapping the virtual keyboard on an extremely small screen is difficult. Further, when one writes characters on the liquid display that is normally sensitive to any type of pressure, a web pad recognizes the characters as a text. In doing so, however, the web pad makes a number of errors (e.g., character recognition error). Also, it is not easy to write document while the web pad is not being steadily supported or is moving.

To overcome such the problems, one carried a separate keyboard and connected the keyboard through a wire connector to the PDA whenever necessary. Thus, the PDA recognizes input signals into the keyboard.

U.S. Pat. No. 6,108,200 discloses a method for directly connecting/detaching a separate keyboard system to/from PDA. FIGS. 1a and 1b diagrammatically illustrate a prior art keyboard apparatus looks like before and after a web pad is installed thereon.

As shown in FIG. 1a, the keyboard apparatus includes an interface 812 mounted with a connector for connecting a web pad to upper portion of a keypad 811. The interface 812 is one body with a keypad cover portion 813. Normally, the cover 813 rotates around a hinge that is installed on one end of the cover 813. According to the prior art keyboard apparatus, the web pad is connected to the keypad 811 by inserting into the interface 812, and a user can input data, e.g., characters, by using the keypad 811.

However, the prior art keyboard apparatus has various problems. Since the keyboard is turned on all the time to have the keypad 812 automatically converted to a mode through which the user can input characters whenever the web pad is connected to the interface 812, the keyboard is on even when the user does not input any data, which consumes much power. Further, if the user puts the cover portion 813 on the keyboard after the web pad is installed into the keyboard, the user cannot use the web pad. Also, the cover portion 813 can rotate only to cover the keypad 811.

When the user wants to show the screen on the portable PC to another person while the display is opened, the user had to turn the entire main body of the computer to face that person. A rotary display that turns around a pivot at one edge of a main body was developed. However, one cannot think of carrying only the main body without display. In addition, the user generally needs a separate driving source to rotate the display. Accordingly, there should be additional space in the main body to install the rotation driving source to increase a size of the portable PC.

Further, notebook PCs use two opening/closing buttons on a cover that includes a display to secure the cover in a closed position to the main or system body. However, such opening/closing apparatus do not work together, and a user has to use fingers of both hands at the same time in order to operate the buttons.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a keyboard apparatus that can attach to the main body of a system being used as web pad to selectively use the keyboard to input text and data.

Another object of the present invention is to provide a keyboard apparatus that reduces power consumption.

Another object of the present invention is to provide a keyboard apparatus that reduces power consumption by allowing the system to operate as web pad only when closed.

Another object of the present invention is to provide a keyboard apparatus that reduces power consumption by enabling the keypad in an open position.

Another object of the present invention to provide a keyboard apparatus detachment apparatus of portable multi-type computer system that moves between a closed position and an open position.

Another object of the present invention to provide a keyboard apparatus detachment apparatus of portable multi-type computer system that is capable of connecting the keyboard apparatus to the system's main body both backward and forward.

At least the above objects and other objects and advantages can be selectively realized in a whole or in part by providing an attachable/detachable keyboard apparatus of portable multi-type computer system that includes a keyboard case having a front case and a rear case that are connected to each other to enclose a space therebetween; a keypad for inputting data being mounted on of the keyboard case; a rotating member for rotating web pad at a designated angle around the keyboard case installed on the keyboard case; a connector for connecting the key pad to the web pad to transmit signals that are inputted from the key pad to the web pad; and a keyboard connecting projection formed at one side of the rotating member for securing the keyboard to the web pad as the keyboard settles in one side of the web pad.

In preferred embodiments according to the present invention, a user can input text and data in the system's main body being used as web pad by selectively using the keyboard, and can save power consumption by allowing the system to operate as web pad only while limiting data input through the keyboard is if the keyboard connected to the system's main body.

To achieve at least the above objects and other advantages in a whole or in part and in accordance with the purpose of the present invention, as embodied and broadly described herein, there is provided a system that includes a keyboard case, an input device exposed in an upper surface of the keyboard case, and a connector mounted on the keyboard case for connection to a portable computer, wherein the connector rotates between a first position and a second position, wherein the keypad is disabled unless the connector is in the second position.

To further achieve at least the above objects and other advantages in a whole or in part and in accordance with the purpose of the present invention, as embodied and broadly described herein, there is provided a keyboard apparatus that includes a keyboard case, an input device exposed in an upper surface of the keyboard case, a connector mounted on the keyboard case for detachable connection to a portable computer, wherein the connector includes a rotational disk that rotates around a fixed point relative to the upper surface of the keyboard case, and a hinge rigidly coupled to the rotational disk displaced a prescribed distanced from the fixed point.

To further achieve at least the above objects and other advantages in a whole or in part and in accordance with the purpose of the present invention, as embodied and broadly described herein, there is provided a portable multi-type computer system that includes a web pad-type computer, a keyboard apparatus that detachably connects to the web pad, wherein the keyboard apparatus includes a keyboard case having a front case and a rear case that are coupled together to enclose a space therebetween, a keypad exposed in an upper surface of the keyboard case, and a keyboard opening/closing apparatus mounted on the keyboard case that selectively rigidly attaches the web pad to the keyboard apparatus, wherein the keypad is disabled unless the keyboard opening/closing apparatus is in an open position.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a diagram that shows an outer appearance of a keyboard disk assembly and parts thereof;

FIG. 8A is a diagram that shows a perspective view illustrating the outer appearance of a preferred embodiment of a keyboard opening/closing apparatus;

FIG. 12 is a diagram that demonstrates exemplary detachment of a protection cover; and FIG. 13a and FIG. 13b are diagrams that show a system main body can be coupled to a keyboard apparatus in forward and reverse directions.

DETAILED DESCRIPTION OF PREFERRED EMBODIMENTS

Figure 1A:
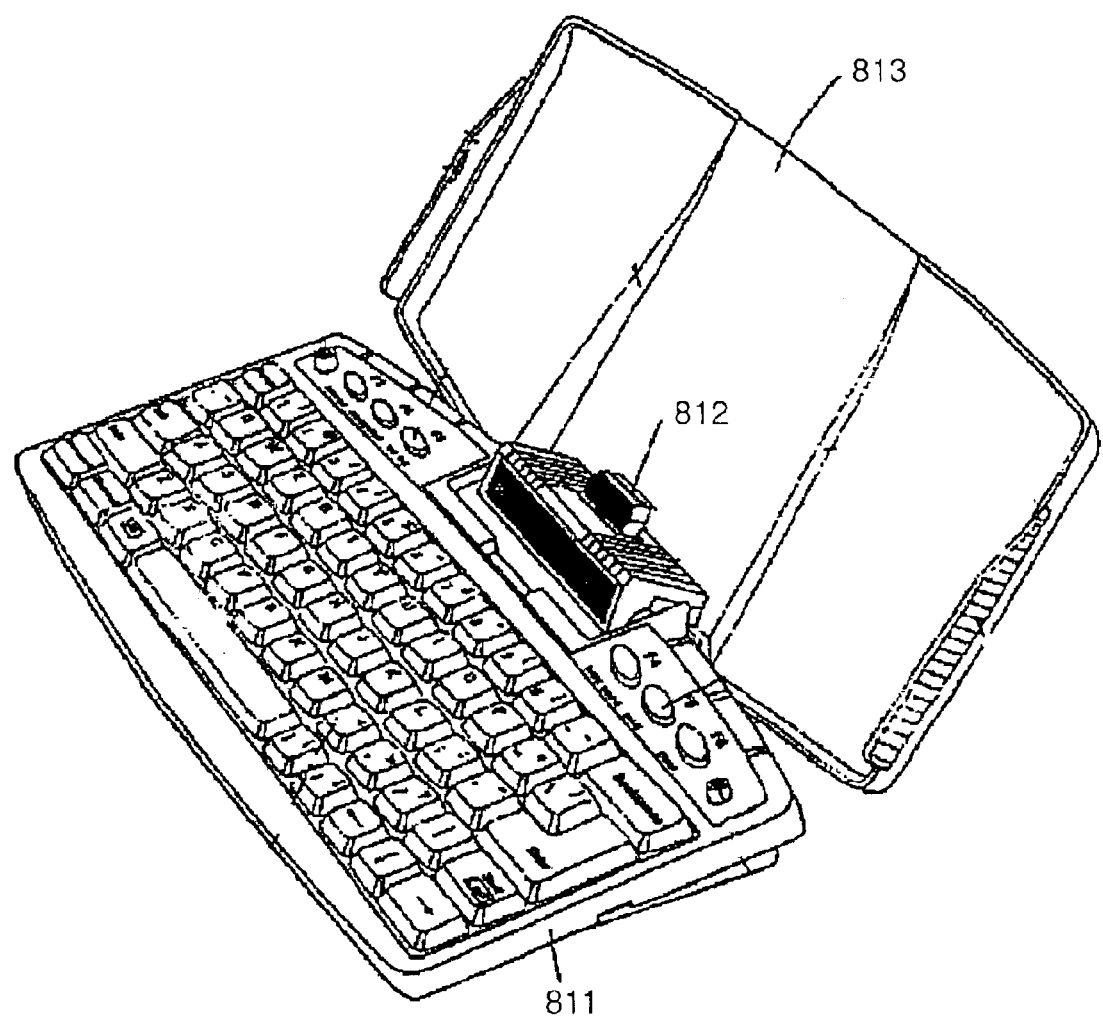
FIG. 1A is a diagram that shows a prior art keyboard apparatus before a web pad is installed thereto.
Figure 1B:
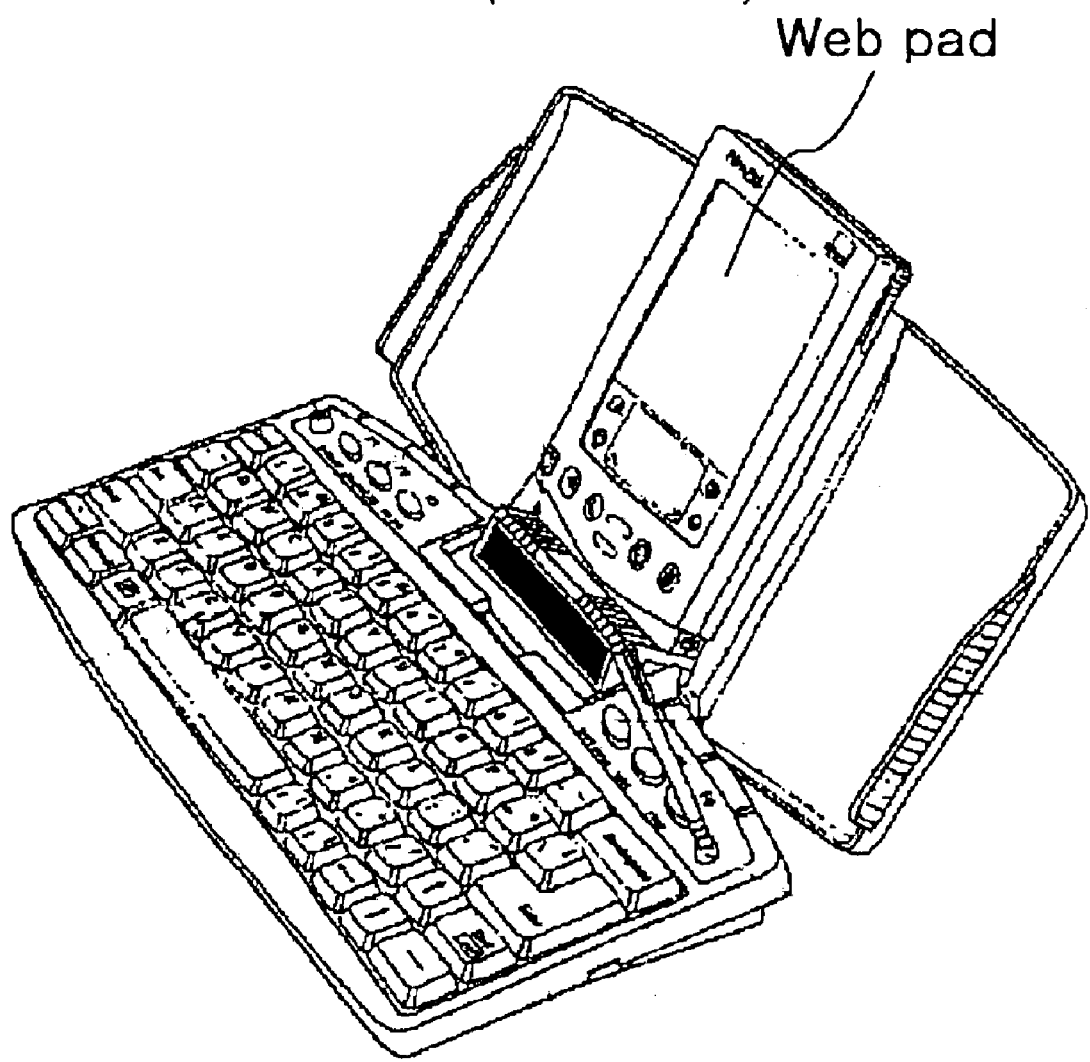
FIG. 1B is a diagram that shows a prior art keyboard apparatus after a web pad is installed thereto.
Figure 2A:
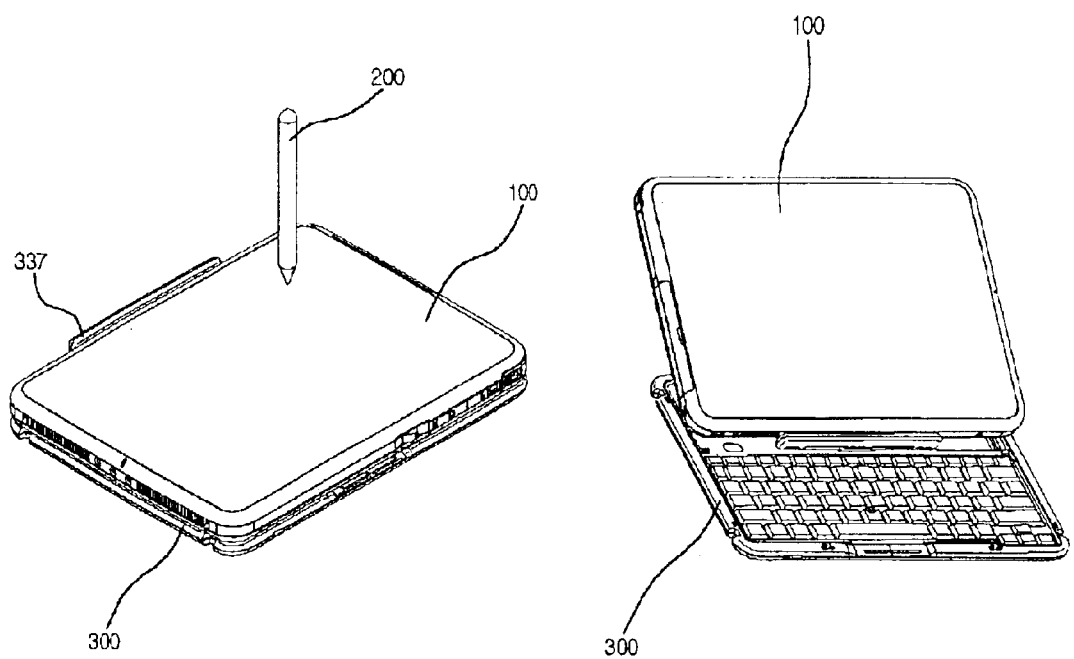
FIG. 2A is a diagram that shows a perspective view of a preferred embodiment of a keyboard apparatus according to the present invention coupled to a main body of a system.
Figure 2B:
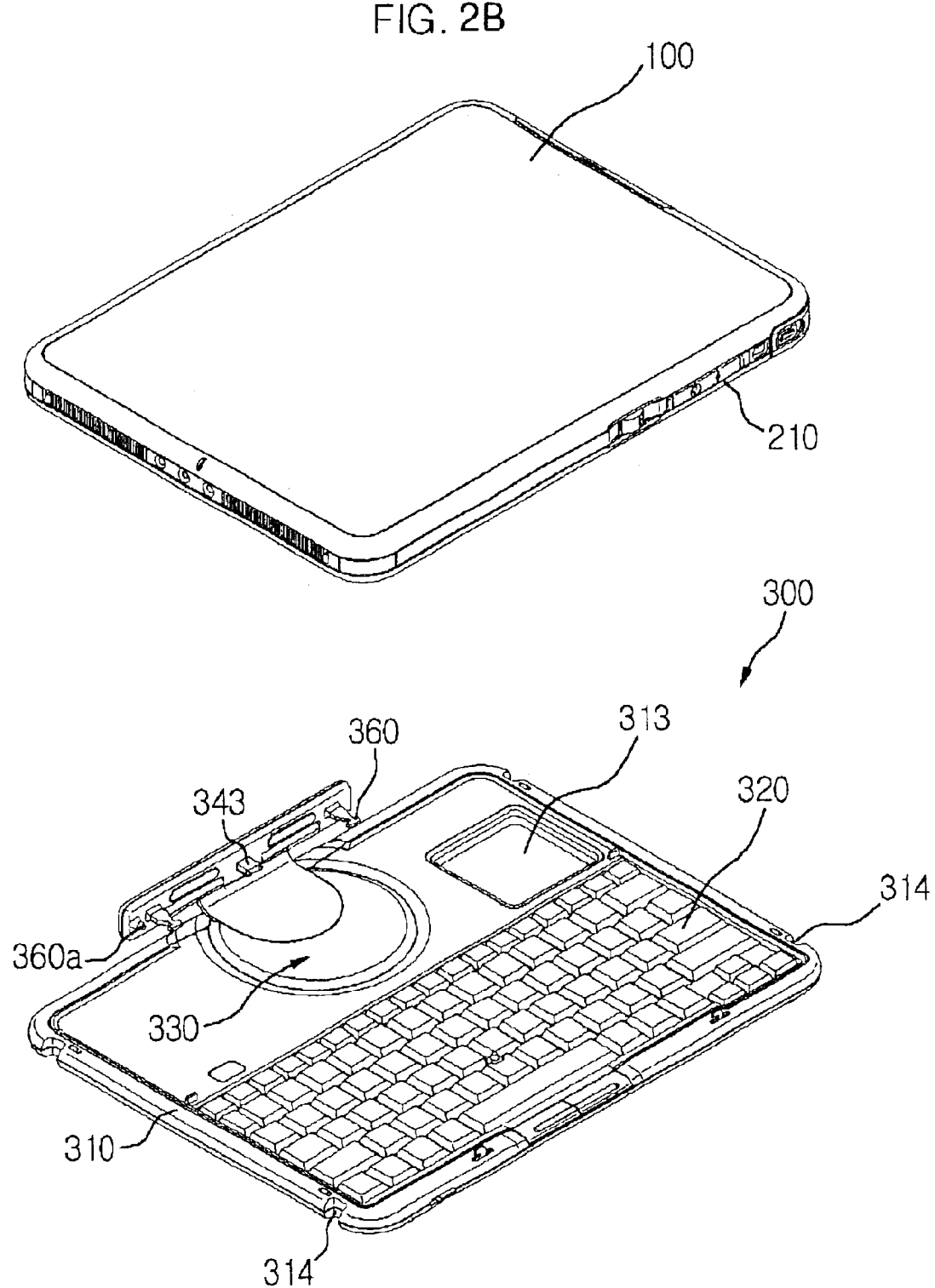
FIG. 2B is a diagram that shows a perspective view of a preferred embodiment of a keyboard apparatus according to the present invention and a main body of a system.

FIGS. 2A–2B are diagrams showing perspective views of a preferred embodiment of a keyboard apparatus according to the present invention that can be coupled to a main body of a system. As shown in FIG. 2A, keyboard apparatus 300 is appropriate for use in a portable multi-system (e.g., web pad function and notebook PC function) computer. The keyboard apparatus 300 can be attached to a main body 100 of a system (e.g., web pad), and one can selectively use a keyboard if data or text should be input. Hence, there is no need to keep the keyboard turned on to stand by for key input after installing the keyboard apparatus 300, and as a result, power consumption can be significantly reduced. When the computer is used as a web pad, a user can detach the keyboard apparatus from the main body and carry more conveniently. However, the present invention is not intended to be so limited. For example, the web pad can be attached in a closed accessible or protected position to a keyboard apparatus.

Preferred embodiments of an attachable/detachable keyboard apparatus 300 of portable multi-type computer system as shown in FIGS. 2A–13B can include a keyboard case 310, a keypad 320 through which a user can input data and a rotating member 330 that enables the keyboard case 310 to rotate around main body 100 of the system, e.g., web pad, at a designated angle and that inverts the system from pen input mode using a stylus 200 to keyboard input mode that uses a keyboard through a rotation operation. A connector 343 can couple the key pad 320 to the system's main body 100 for transmitting signals having been input from the key pad 320 to the system's main body 100. A keyboard docking projection 360 can secure the keyboard apparatus 300 to the system's main body 100 to protect a display screen as desired or when the key input is not performed for an extended period of time.

A fixed projection insert hole 313 is preferably formed at one side of the keyboard case 310 for mounting on a docking system or for connecting the system's main body to a connector of a docking system, external expansion apparatus or the like, if necessary while the main body 100 can remain connected to the keyboard. Also, at the other side of the keyboard case 310, there is a plurality of passing grooves 314 that can secure projections for the purpose of making the connection between a cradle, another expansion apparatus, and the main body of the system 100 more secure while reducing or avoiding any interference to web pad (e.g., system) securing projections.

The main body of the system 100 preferably has a display at one front surface and a battery cover (not shown) at its opposing rear surface. Except the display and the rear, the other four edges are all sides. Preferably, one side of the main body 100 includes a plurality of keyboard docking projection insert holes (not shown in FIGS. 2A–2B) for coupling to the keyboard apparatus 300.

Figure 3:
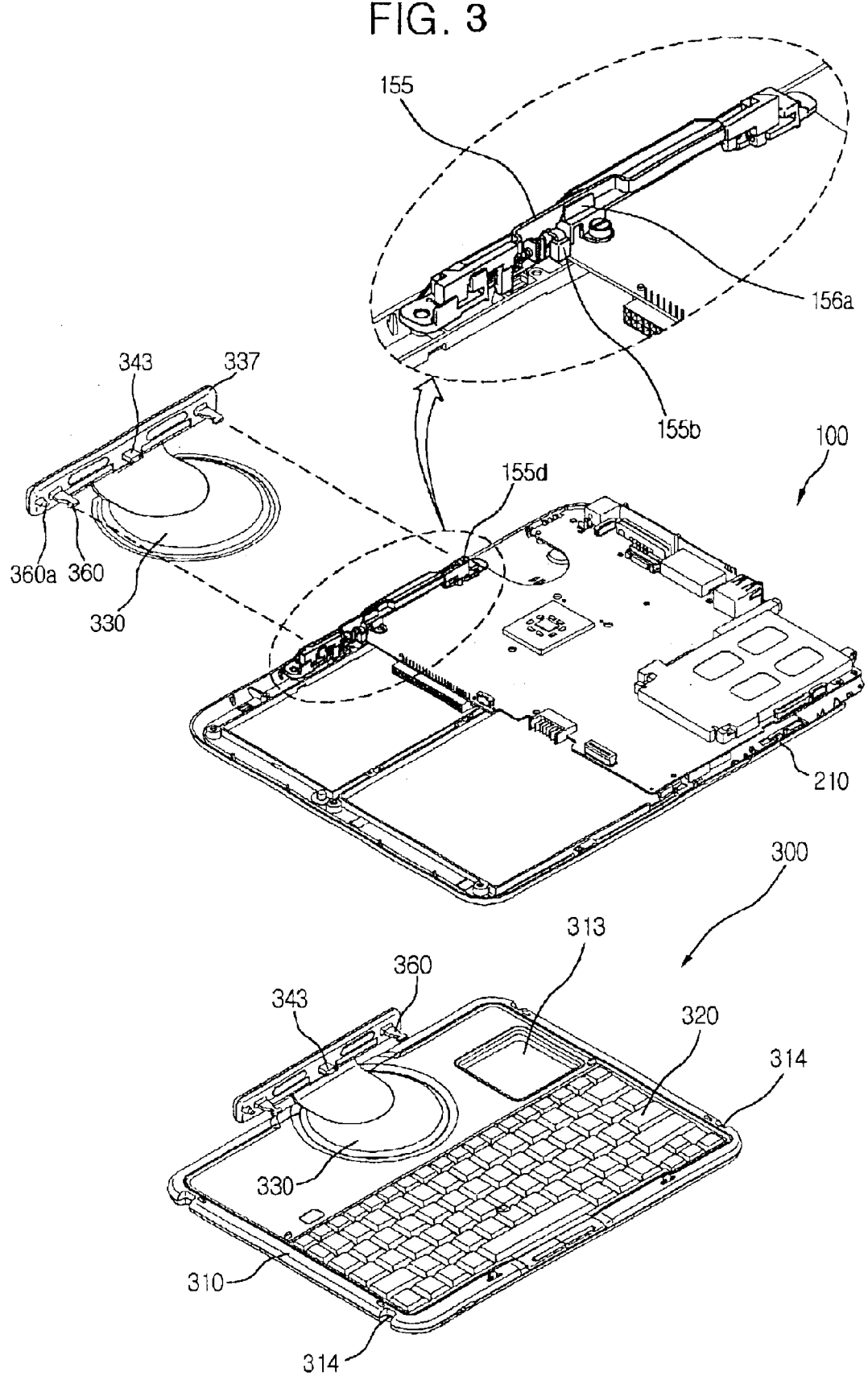
FIG. 3 is a diagram that shows a preferred embodiment of a keyboard apparatus according to the present invention for connection to a main body of a system.

Through a keyboard docking projection insert hole, the male connector 343 and keyboard docking projection 360 can be inserted and fixated with a prescribed movement. More specifically, if a user wants to connect the keyboard 300 to the main body 100 of the system, the user should pass the keyboard docking projection 360 through the keyboard docking projection insert hole, and then lock in a locking projection detaching side preferably at the end of a first frame 155 as shown in FIG. 3.

There can be a reverse-insertion preventing mechanism such as a reverse-insertion preventing projection 360a nearby the keyboard docking projection 360, and a groove (not shown) at an opposite side of the main body 100, through which the reverse-insertion preventing projection 360a can pass. In this manner, the display is preferably coupled, facing outward from the system's main body 100 while the rear of the main body is not turned to the outside.

However, reverse insertion can be allowed, and the reverse-insertion preventing projection 360a does not have to be formed. In such case, the display surface of the system could be set up to face the outside, or the display surface could face the key board apparatus with the rear of the system 100 facing outward.

FIG. 2A represents the keyboard apparatus 300 coupled to the main body 100 of the system. FIG. 3 is a diagram that shows a sectional perspective view of parts of the keyboard apparatus 300 according to the present invention.

Figure 4:
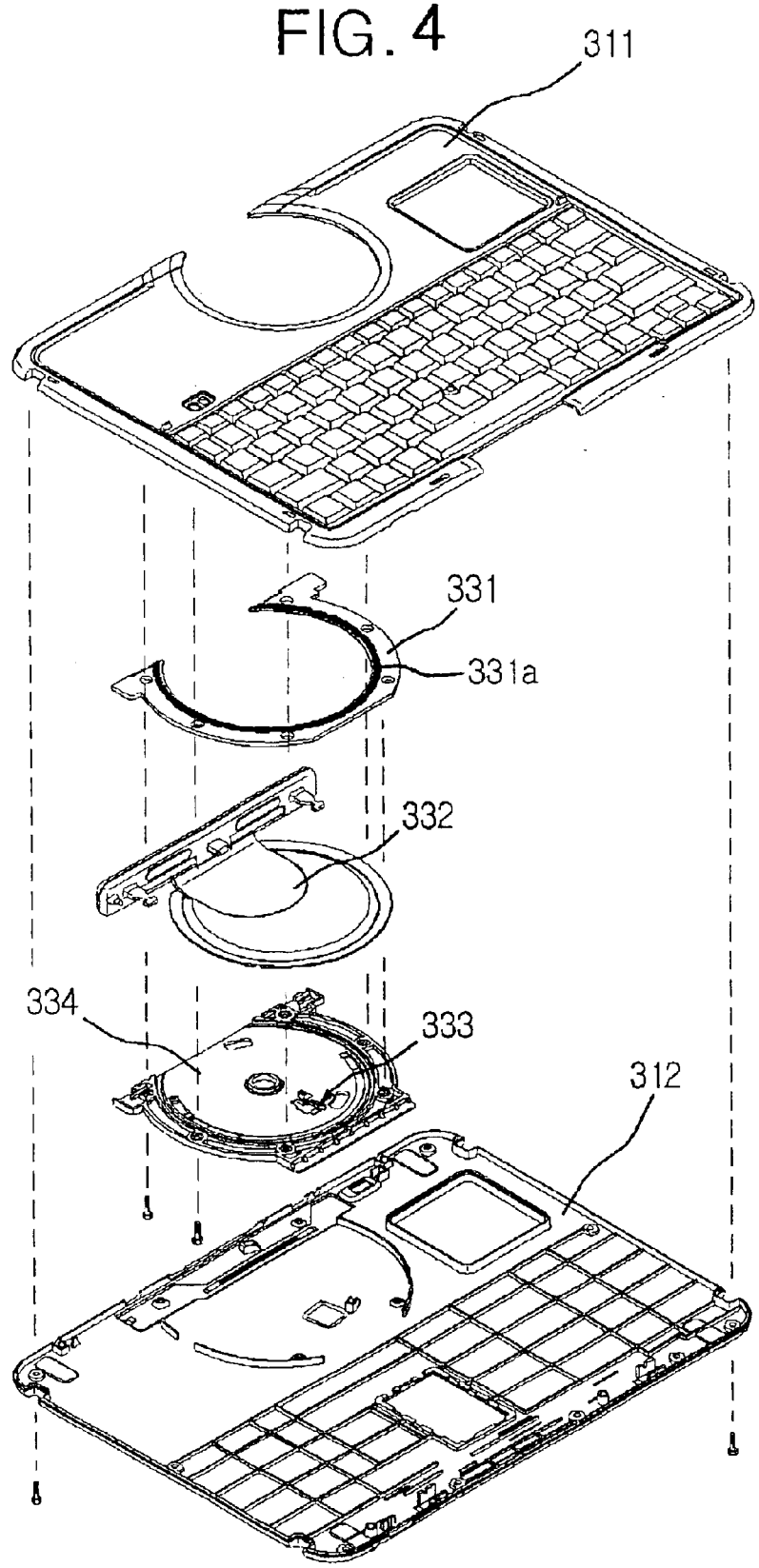
FIG. 4 is a diagram that shows a perspective view of parts of a preferred embodiment of a keyboard apparatus according to the present invention.

As shown in at least FIGS. 3–4, a type of rotating member 330 can be employed to rotate the system's main body 100 around the keyboard apparatus 300 at a designated angle. Preferably, the rotating member 330 is secured on the rear of a front case 311 for better rotation. The rotating member 330 can include an upper rotation guide member 331 disposed at the rear surface of the front case 311, a keyboard disk assembly 332 that rotates along a guide rail 331a formed on the rear surface of the upper rotation guide member 331 and a lower rotation guide member 334 for fastening the upper rotation guide member 331 and the keyboard disk assembly 332 preferably to a boss formed on the rear surface of the front case 311. The lower rotation guide member 334 can include a data input mode inverting switch 333 at a certain position of the front surface.

The guide rail 331a formed on the rear surface of the upper rotation guide member 331 is preferably a projected guide surface with a concentric circular shape. However, the present invention is not intended to be so limited. The guide rail 331a should allow rotation relative to the guide surface formed on the upper surface of the lower rotation guide member 334 while coming in contact with the guide surface at the same time. The boss on the rear surface of the front case 311 can go through a certain position of the upper rotation guide member 331 on which a plurality of through holes 334 is formed to make the upper rotation guide member 331 better supported by the boss.

FIG. 5 is a diagram that shows an outer appearance of an exemplary keyboard disk assembly and functionally decomposed parts of the exemplary keyboard disk assembly.

Figure 6:
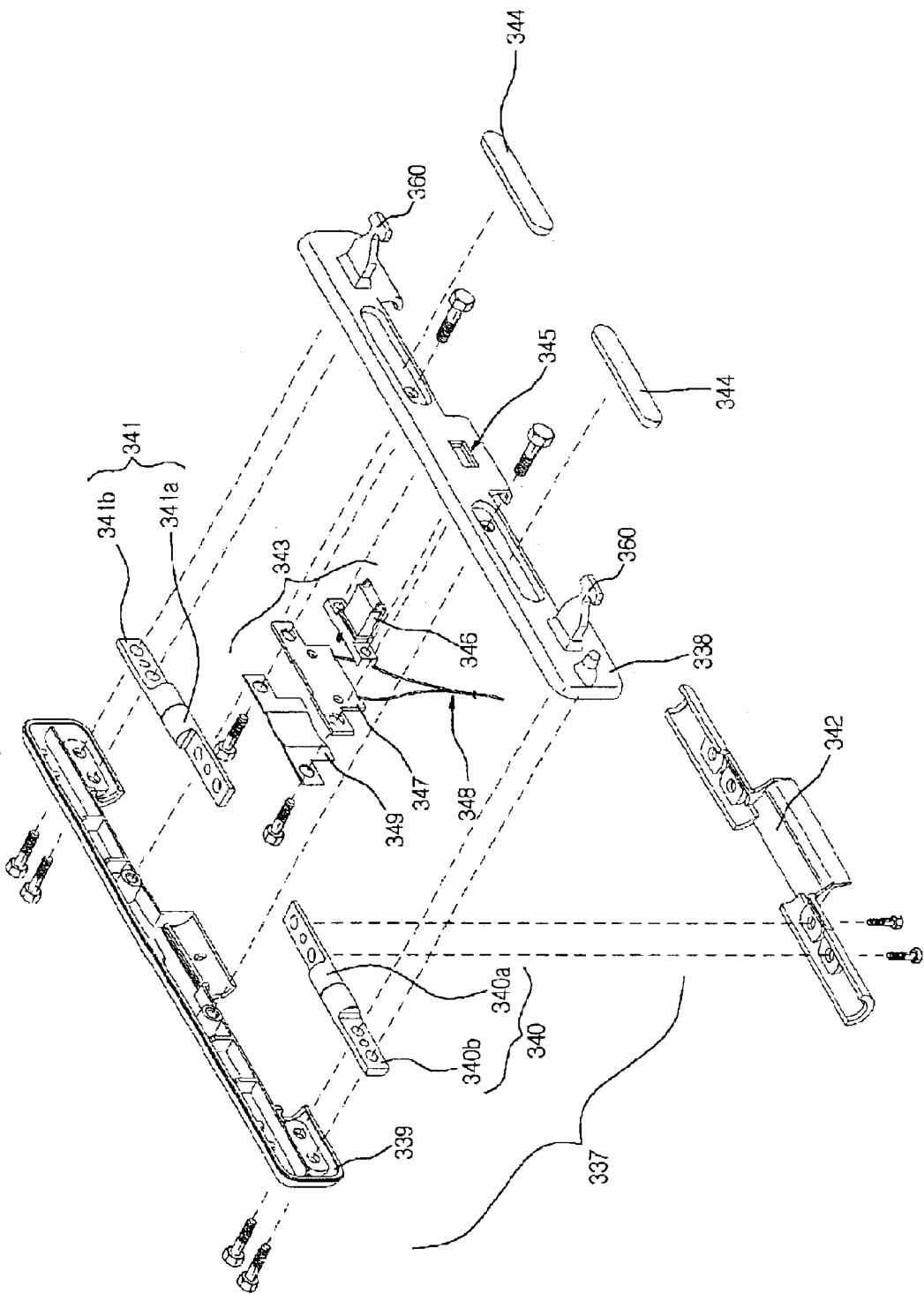
FIG. 6 is a diagram that shows parts of a hinge assembly.

FIG. 6 is a diagram that shows a decomposition of parts of an exemplary hinge assembly.

As shown in FIGS. 5–6, the keyboard disk assembly 332 is set up to securely rotate along a guide rail 331a formed on the rear surface of the upper rotation guide member 331. The keyboard disk assembly 332 includes a keyboard disk 335 that rotates along a guide rail 331a formed on the rear surface of the upper rotation guide member 331. The keyboard disk 335 can include a projection 335a on the rear side that can contact with a data input mode inverting switch 333 along the rotation, a hinge frame 336 being screwed onto the keyboard disk 335, and a hinge assembly 337 that rotates at one side of the hinge frame 336.

The hinge assembly 337 further can include a first connector cover 338; a second connector cover 339 on an opposite side to the first connector cover 338 and a first and second hinges 340 and 341 disposed between the first connector cover 338 and the second connector cover 339 being fastened (e.g., screwed) at both ends thereof. A hinge cover 342 can fasten the first and second hinges 340 and 341 (e.g., with hinged sections 340a, 340b and 341a, 341b) onto the hinge frame 336, and at the same time cover them.

FIG. 6 shows exemplary internal/external couplings. The hinge frame 336 can be screwed down to the upper end of the keyboard disk 335, and the hinge assembly 337 is coupled to the edge of the upper end of the hinge frame 336 in such manner that the hinge assembly 337 may rotate between the keyboard apparatus 300 and the system 100 of the system at a designated angle.

The first connector cover 338 and the second connector cover 339 on the hinge assembly 337 are preferably screwed onto each other while facing each other. A rubber bumper 344 can be adhered to part of the screw including the screw head, making the outer appearance thereof attractive.

In addition, male connector 343 for accessing/transmitting input signals from the keyboard apparatus 300 to the system's main body 100 is preferably installed close to the center of the hinge assembly 337. The male connector 343 is attached in such way that the male connector 346 faces the front side bypassing through a male connector hole 345 from the rear of the first connector cover 338. Usually, the male connector 346 is fastened (e.g., soldered) up onto a small-sized auxiliary print circuit substrate 347, and a signal cable 348 for transferring input signals from the keyboard apparatus 300 to the main body 100 is coupled to one side of the auxiliary print circuit substrate 347. The auxiliary print circuit substrate 347 can be assembled/secured onto the boss on the rear surface of the first connection cover 338, being resiliently supported by a separate plate spring 349.

The male connector 346 being assembled/secured onto the first connector cover 338 preferably can move to every direction, namely up and down, and right to left. Such a connector can simplify connection of the keyboard apparatus 300 to the system main body 100, and reduce or prevent any possible damage on each connector as the keyboard is coupled to an arm connector, which is an opposite part to the male connector 346, guiding both opposite sites to be bonded together.

The other end of the signal cable 348 can be guided by a cable guide groove 335e that is formed on the keyboard disk 335, and pass through a cable through hole 335d that is formed on the central part of the keyboard disk 335. The signal cable 348 eventually can be coupled to a print circuit substrate (not shown) mounted in the keyboard apparatus.

At certain places of the rear of the keyboard disk 335, there is preferably formed first and second projections 335a and 335b. These projections enable the data input mode inverting switch 333, which can be secured at an upper opposite position to the lower rotation guide member 334, to preferably drive an inverting lever, thereby preferably realizing inversion from data input mode using keyboard to data input mode using a stylus pen or the like. The data input mode inverting switch 333 can be electrically coupled to the print circuit substrate (not shown) of the keyboard apparatus.

After the keyboard disk assembly 332 is coupled to the upper rotation guide member 331 using a guide groove 335f, enabling them to rotate with each other, it is fastened using the lower rotation guide member 334 onto the rear surface of the front case 311. Thus, the front case 311 can be attached (e.g., screwed) with the rear case 312.

Figure 7:
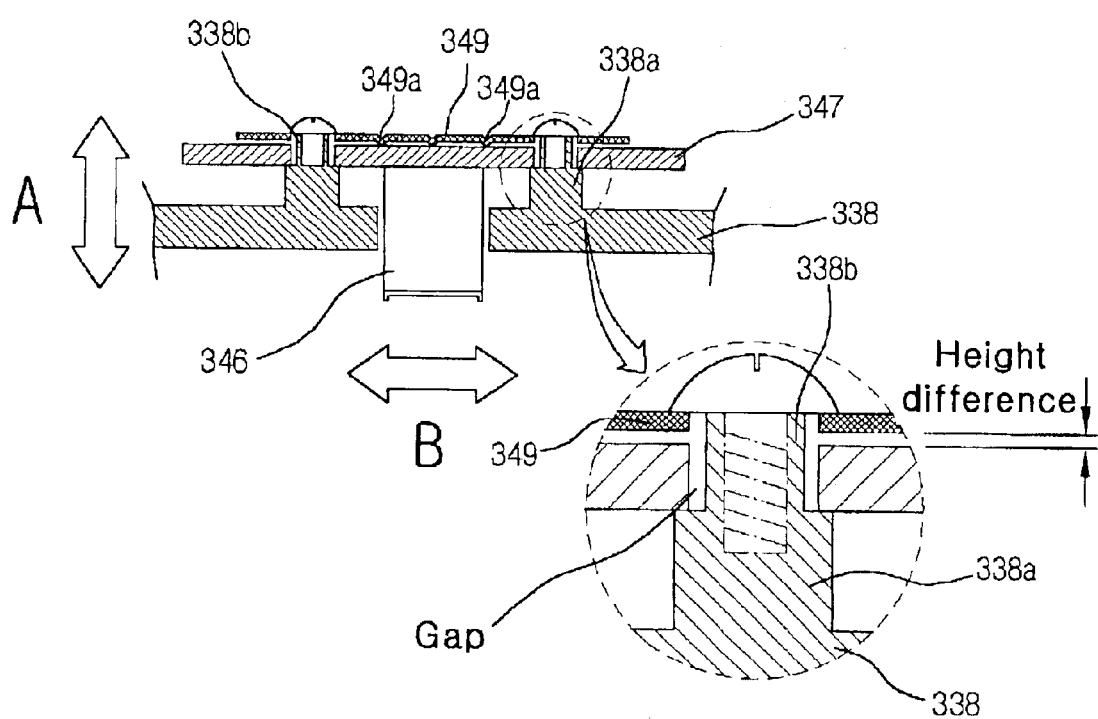
FIG. 7 is a diagram that shows a male connector coupled to a first connector cover.
Figure 10:
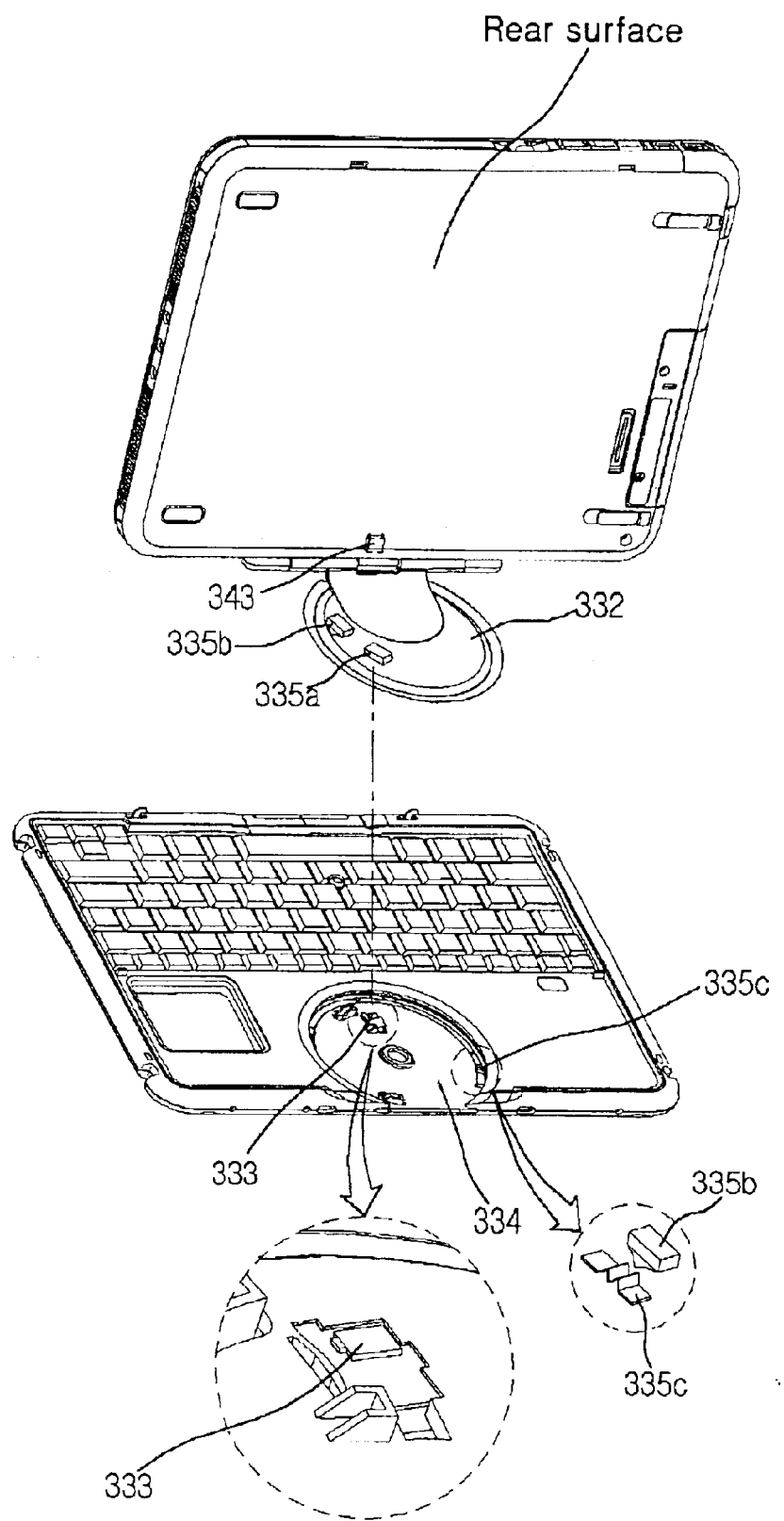
FIG. 10 is a diagram that shows a sectional perspective view depicting components of a rotation detecting apparatus.

FIG. 7 is a diagram that shows an exemplary coupling between a male connector and a first connector cover. As shown in FIG. 10, the boss, which is formed on the rear surface of the first connector cover 338 for facilitating the male connector 346 to move around, has two steps. A second step 338b with an internal arm screw is screwed onto the center of a first step 338a at the auxiliary print circuit substrate 347. Preferably, the height of the second step 338b is greater than the sum of thicknesses of the auxiliary print circuit substrate 347 and the plate spring 349, and external size of the second step 338b is smaller than the screw hole on the auxiliary print circuit substrate 347. In this manner, the auxiliary print circuit substrate 347 can move to every direction, i.e., back and forth (e.g., A direction) and right to left (e.g., B direction), receiving elasticity of the plate spring 349 even after the printed circuit substrate 347 is screwed down.

Further, a spring projection 349a is formed on the rear surface of the plate spring 349. Preferably, the projection is directed to the first connector cover 338 in order to secure the auxiliary print circuit substrate 347 always to the first step 338a by the plate spring 349.

Figure 8B:
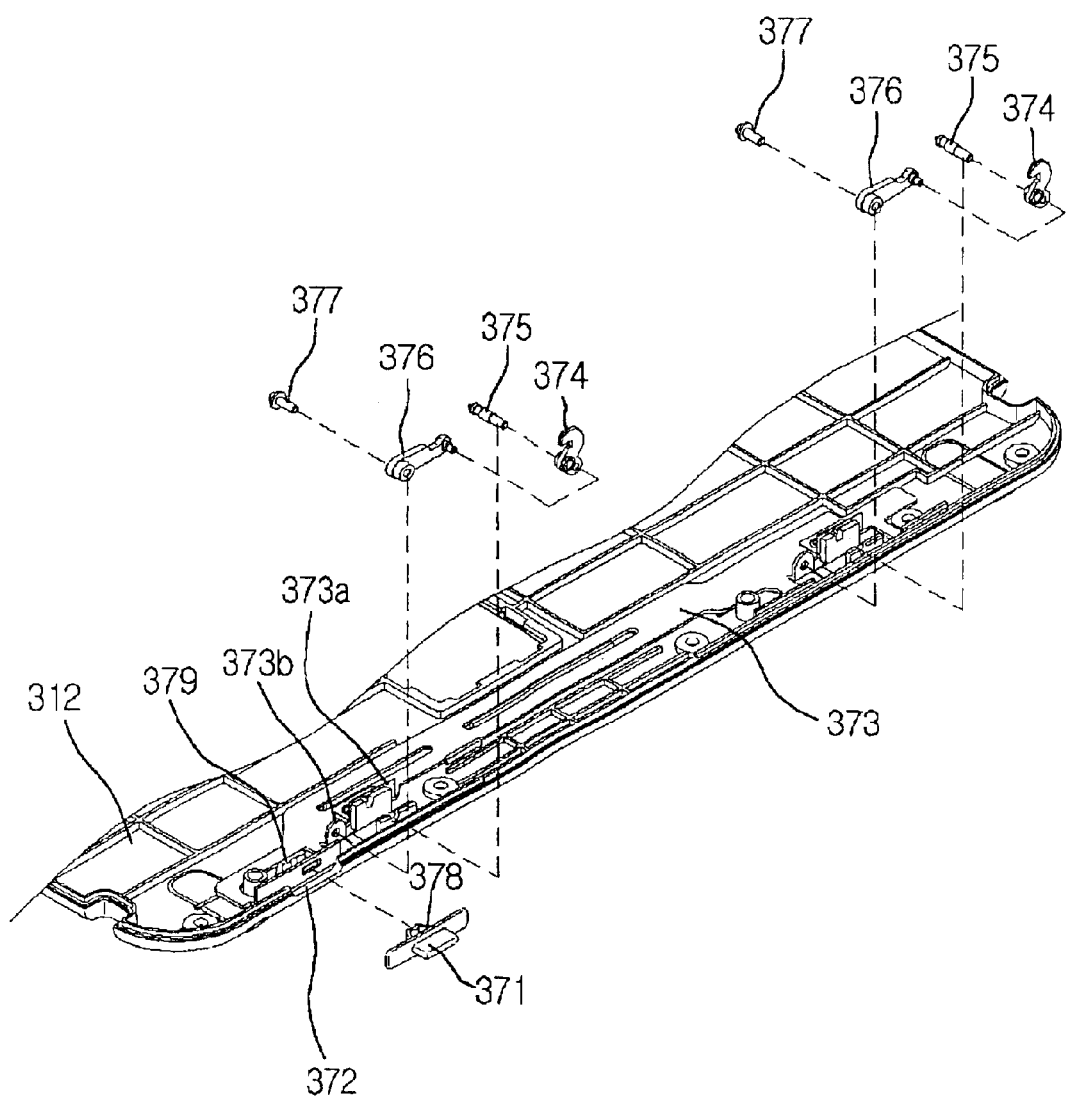
FIG. 8B is a diagram that shows a sectional perspective view of components of a preferred embodiment of a keyboard opening/closing apparatus.
Figure 8C:
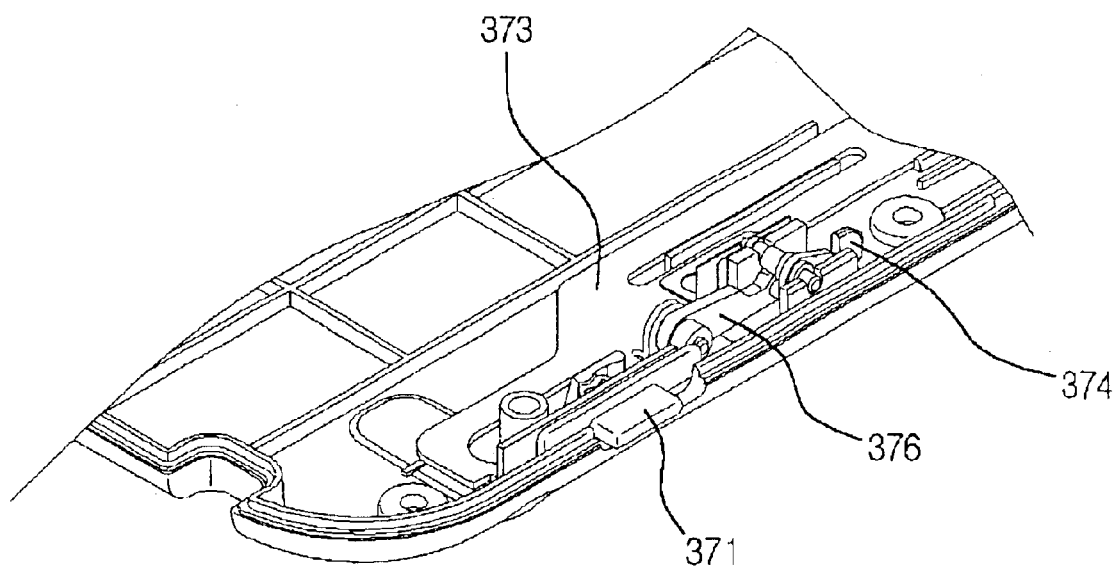
FIG. 8C is a diagram that shows a position where a projection of the main body is operated before operating a preferred embodiment of a keyboard opening/closing apparatus.
Figure 8D:
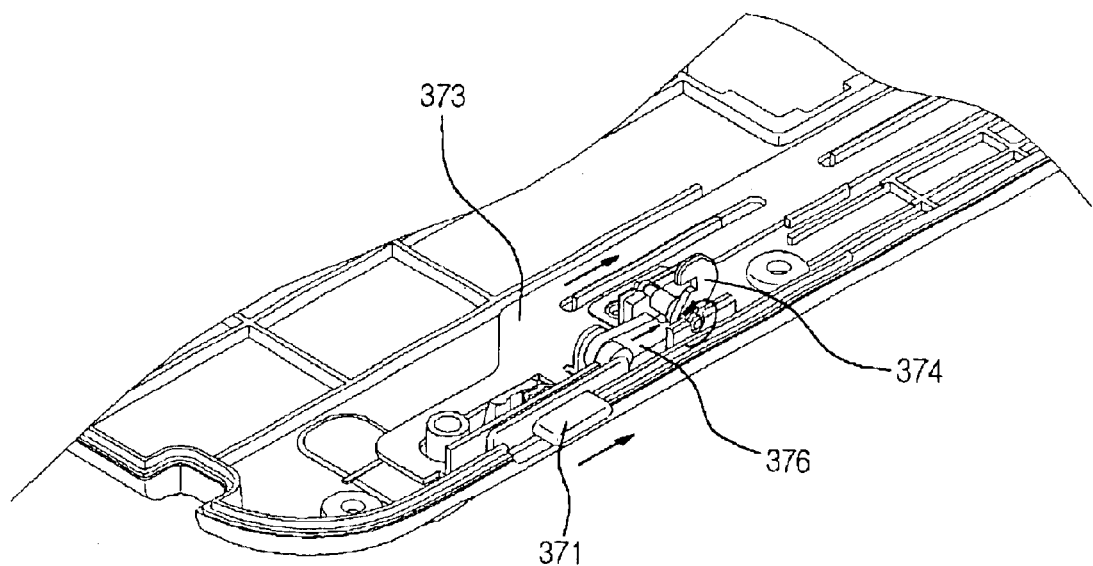
FIG. 8D is a diagram that shows a position where a projection of the main body is operated after operating a preferred embodiment of a keyboard opening/closing apparatus.
Figure 8E:
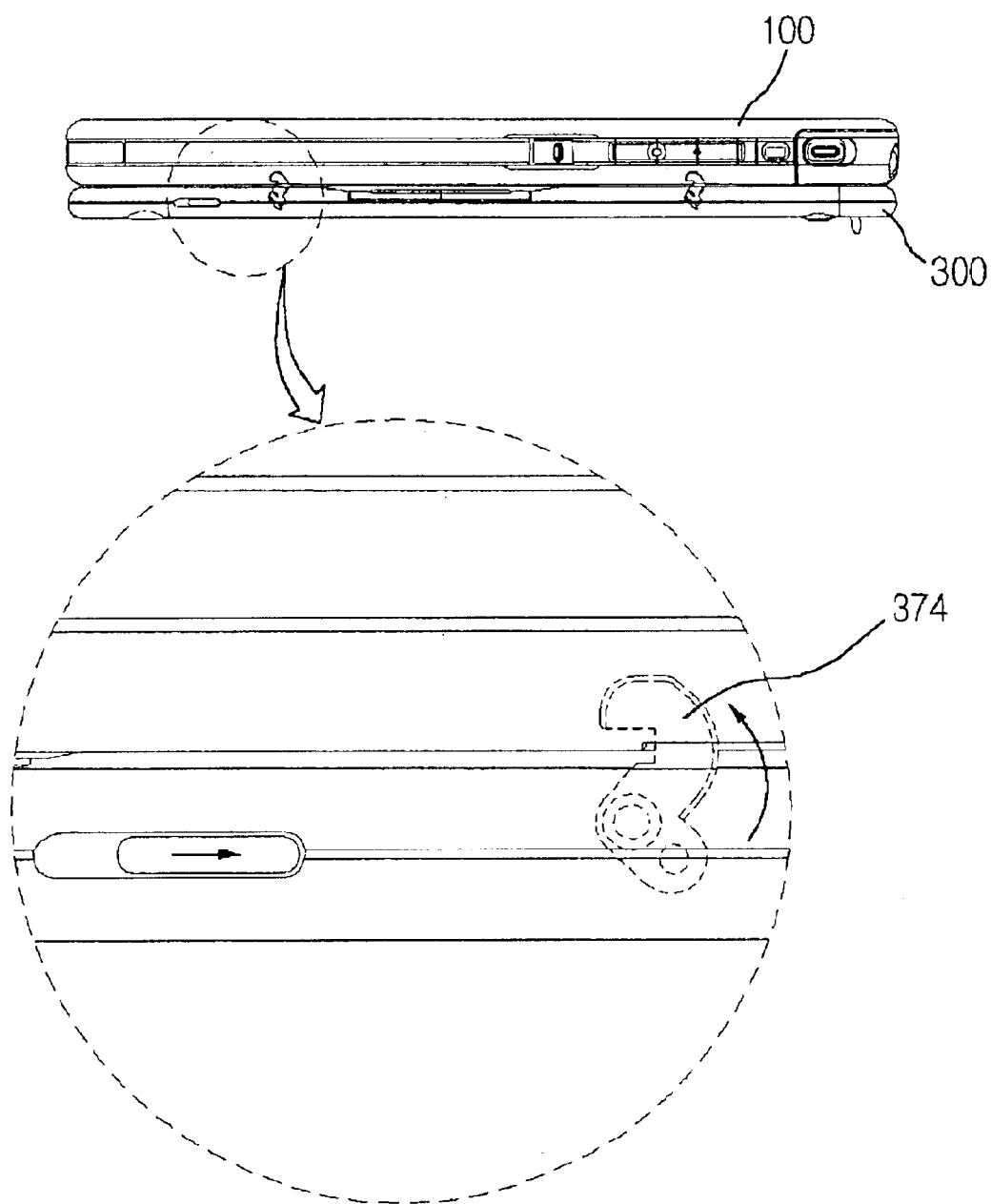
FIG. 8E is a diagram that shows a state of a system after a preferred embodiment of a keyboard opening/closing apparatus is connected to a main body.

FIG. 8A is a diagram that shows a perspective view illustrating the outer appearance of an exemplary keyboard opening/closing apparatus. FIG. 8B is a sectional perspective view diagram showing major components of the exemplary keyboard opening/closing apparatus. FIG. 8C is a diagram showing a position of a projection of the main body before operating the keyboard opening/closing apparatus. FIG. 8D is a diagram showing a position of a projection of the main body after operating the keyboard opening/closing apparatus. FIG. 8E is a diagram that shows a position of the system after the keyboard opening/closing apparatus is properly coupled to the system main body.

As shown in FIGS. 8A–8E, a keyboard opening/closing apparatus 370 is preferably installed at one side of the front of the keyboard case 310, in order to facilitate connection and separation of the keyboard apparatus 300 to and from the system's main body 100 especially when the user wants to use the computer system that had been coupled to the keyboard apparatus 300 by folding or spreading it. More specifically, the keyboard opening/closing apparatus 370 can include a keyboard opening/closing button 371, a button receiving hole 372 formed on the keyboard case to receive the button and a first operating lever 373 that can slide right to left, being guided by a guide boss mounted on the rear case and operated by the keyboard opening/closing button 371. A main body locking projection 374 can rotate as the first operating lever starts operating.

Preferably, the main body locking projection 374 is supported by a first catching pin 375 to be able to rotate on the rear case 312. Also, a second operating lever 376 can be used to facilitate rotation of the main body locking projection 374 by the first operating lever 373. One side of the second operating lever 376 can work together with the first operating lever 373 by a second catching pin 377. The other side of the second operating lever 376 can be caught by a hole that is formed at one side of the main body locking projection 374 in order to transfer sliding motion of the first operating lever 373, and eventually enabling the main body locking projection 374 to rotate.

Further, one side of the first catching pin 375 can guide the first operating lever 373. In such case, partial end of the first operating lever 373 is pleated, and includes a guide groove to received or guide the first catching pin 375.

Preferably, two main body locking projections 374 are respectively installed on both sides of the front of the keyboard case 310, each being separated by certain distance, in order to maintain secure connection between keyboard apparatus 300 and system's main body 100. Other components for driving the main body locking projection 374 are assembled in such a manner as to cooperate together on the first operating lever 373 in accordance with opening/closing operation of the keyboard opening/closing button 371.

Operations of the main body locking projection 374 together with the keyboard opening/closing button 371 to couple the keyboard apparatus 300 with the system 100, or how these two are disconnected from each other will now be described. If the user pushes the keyboard opening/closing button 371 to the opening direction (e.g., right direction), the first operating lever 373 on the rear surface of the keyboard opening/closing button can move to the right direction also. When the first operating lever 373 slides, the second operating lever 376 moves to the right direction at the same time.

Motion of the second operating lever 376 is transferred to the main body locking projection 374 that rotates around the first catching pin 375, and the main body locking projection 374 preferably rotates counterclockwise. In this way, the main body locking projection 374 is properly secured to a sidewall of the catching groove that can be formed on the case of a main body of the system 100 as shown in FIG. 8E.

On the contrary, if the user pushes the keyboard opening/closing button 371 in a reverse direction (e.g., the left direction), the first operating lever 373 moves to the left, and eventually, the main body locking projection 374 rotates clockwise. As a result, the sidewall of the catching groove that is formed on the case of the main body 100 breaks away from the catching part on the main body locking projection 374, and the system's main body 100 can be opened from the keyboard apparatus 300.

In a final position (e.g., the main body locking projection 374 is fastened or caught by the sidewall of the catching groove on the case of the main body 100 conforming to the operation of the keyboard opening/closing button 371), a tension device such as tension unit 378 can be further installed at the rear surface of the keyboard opening/closing button 371 to lock the keyboard opening/closing button 371 to the final position. A tension unit groove 379 is installed at an opposite position to the tension unit 378 on the rear case 312. In this manner, the tension unit 378 on the rear surface of the keyboard opening/closing button 371 can preferably be safely locked to the tension unit groove 379, and, the keyboard opening/closing button 371 can be locked to its final position. Hence, when the main body and the keyboard are closed, the keyboard opening/closing button 371 remains locked, so the main body locking projection 374 cannot easily be separated from the catching groove on the case of the system 100 as shown in FIG. 8E.

When the user wants to open a keyboard apparatus such as keyboard apparatus 300 that is interlocked to the main body of the computer system 100, given that the user had been carrying the computer system coupled with the keyboard apparatus 300 or the user had been using the computer system 100 (e.g., web pad), the user can operate the keyboard opening/closing button 371 and open (e.g., unfold) the web pad main body 100 around the hinge assembly 337 of the keyboard apparatus 300.

Figure 9A:
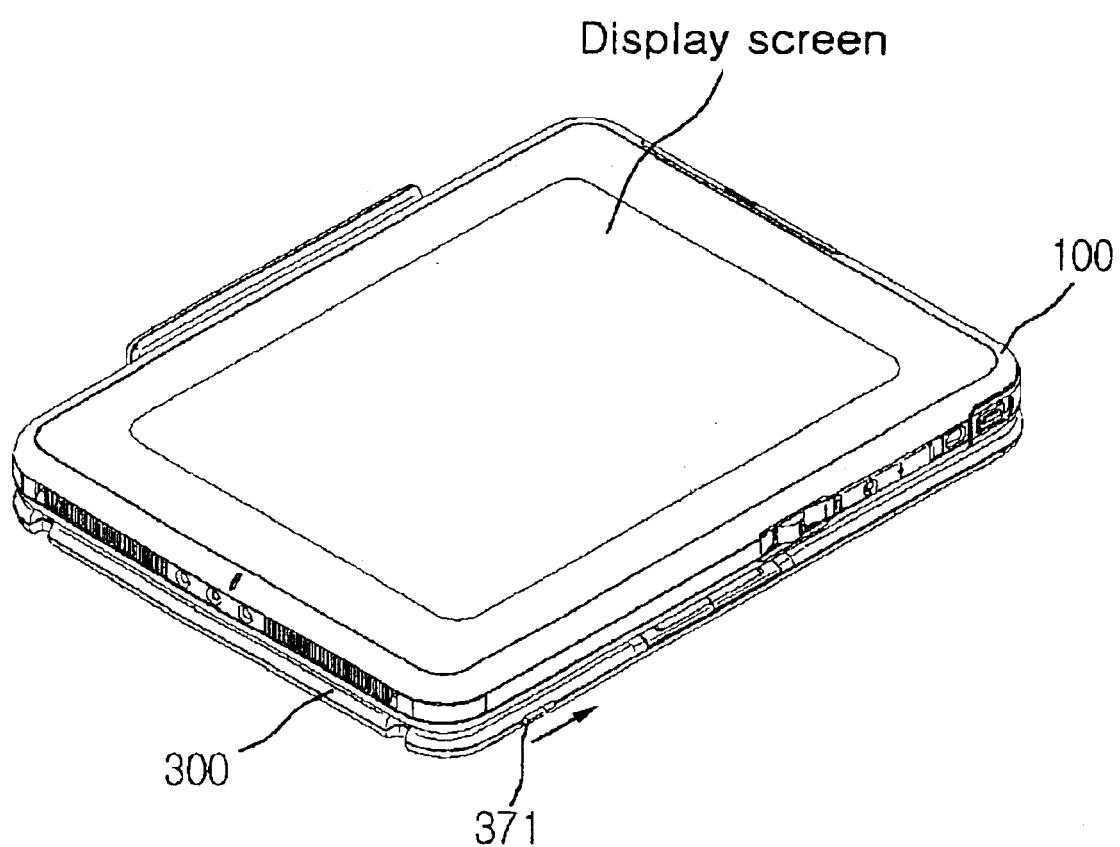
FIGS. 9A through 9C are diagrams that show exemplary operations of opening and inverting a preferred embodiment of a keyboard apparatus.
Figure 9B:
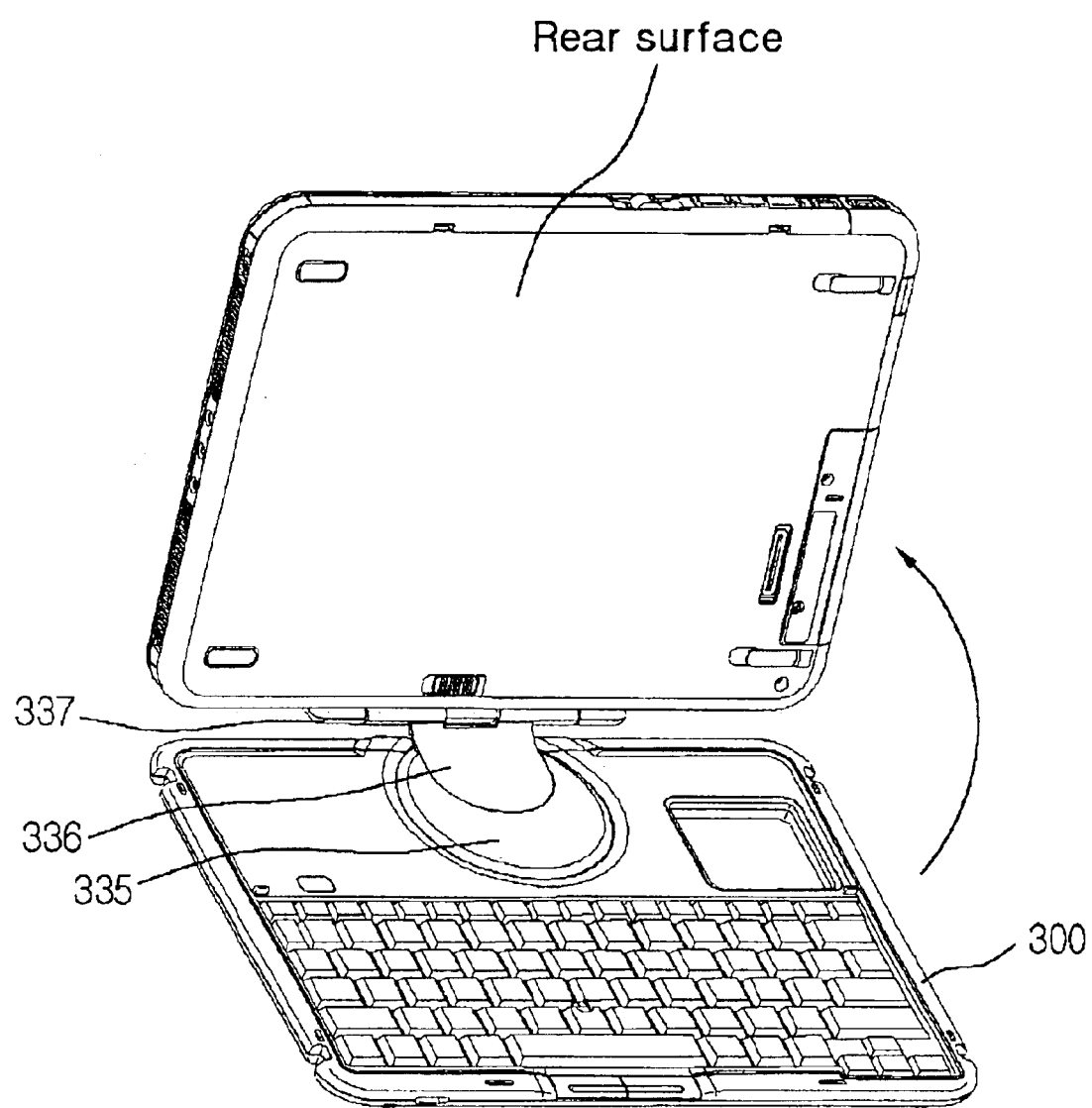
Figure 9C:
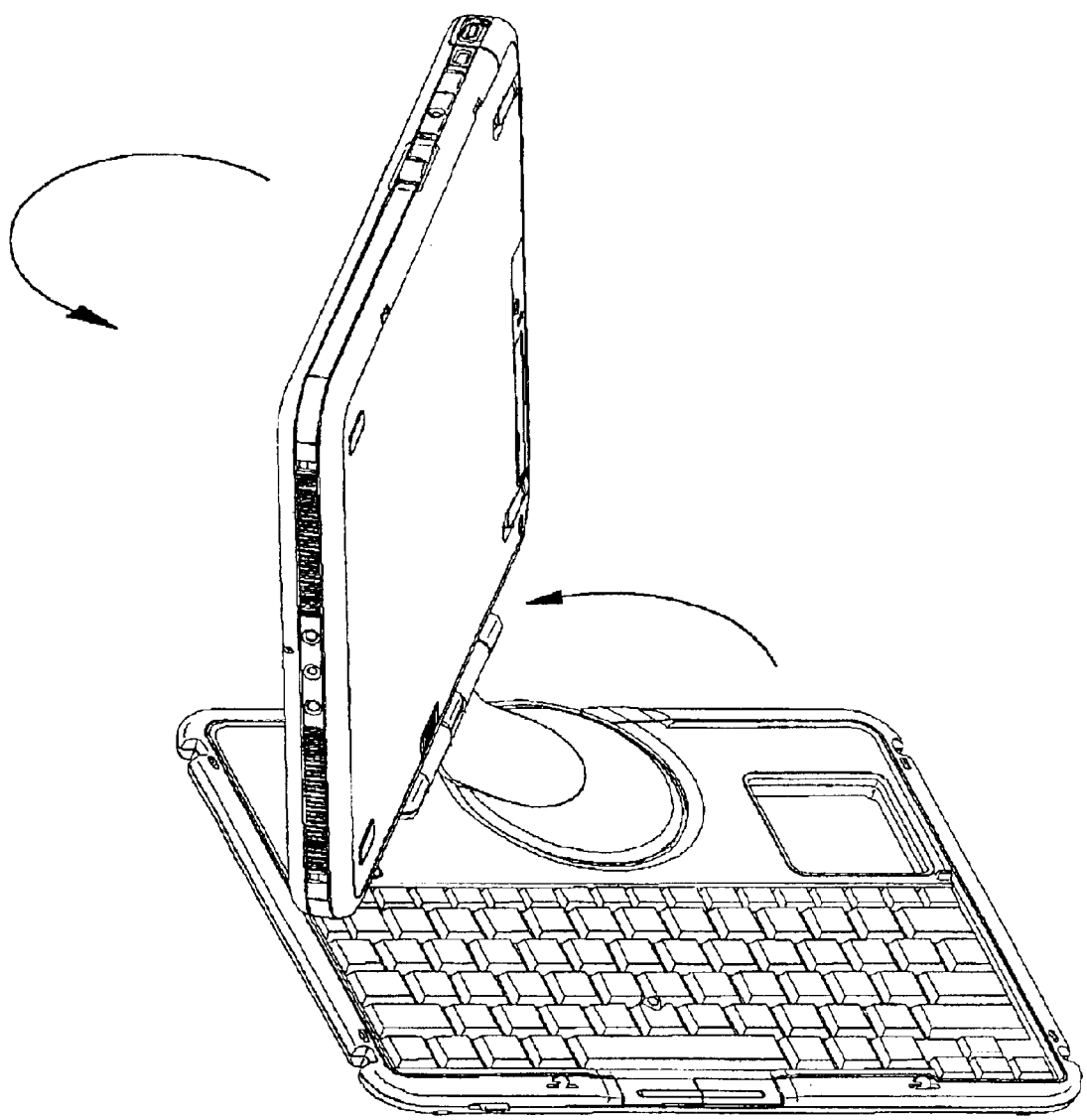

In such a case, the user comes to face the rear surface of the system main body 100, not a display screen or touch screen. Therefore, it is necessary to secure the position of the display screen by rotating it (e.g., counterclockwise) to face the user (refer to FIGS. 9A, 9B, and 9C). Exemplary operations from a closed position to any open position are shown in FIGS. 9A–9C.

Rotation of the system main body 100 including the display screen preferably works together with the rotary keyboard disk assembly 332 on the keyboard case 310 of the keyboard apparatus 300. To rotate the main body 100 having been opened from the keyboard apparatus 300 toward the user's direction, the user preferably needs to rotate the system main body 100, (e.g., 180 degrees) along the rotation direction of the keyboard disk assembly 332, for example, supposing that the keyboard apparatus 300 is placed on a desk.

When the user uses the computer while carrying the computer system where the keyboard apparatus 300 is coupled to the system's main body 100, the computer system can perform web pad functions only (e.g., display surface facing out). This is because data input using keypad 320 is preferably not possible when the keypad 320 has not been exposed to the outside, and control unit in the system main body 100 prohibits data input through keyboard if the keyboard apparatus 300 and the main body 100 are coupled to each other in the closed position.

FIG. 10 is a diagram that shows a sectional perspective view of components of a rotation detecting apparatus according to a preferred embodiment. As shown in FIG. 10, when the user opens the system main body 100 preferably around the hinge assembly 337 of the keyboard apparatus 300 by operating the keyboard opening/closing button 371, and preferably rotates the system main body 100 at about 180 degrees along the rotation direction of the keyboard disk assembly 332, the main body 100, through a rotation detecting apparatus that can be mounted using the rotating member is preferably converted a data input mode using a keyboard. The rotation detecting apparatus can be secured at the rear surface of the rear case 312. The rotation detecting apparatus can include a lower rotation guide member 334 with a data input mode inverting switch 333 being fixated at a prescribed position on the front surface that faces the rear case 312, a keyboard disk assembly 332 and the male connector 343. The keyboard disk assembly 332 is disposed between the front case 311 and the lower rotation guide member 334 and coupled so that it can rotate along the guide groove formed on the lower rotation guide member 334, including a projection 335a that is coupled to the main body and generates a switching signal by contacting the data input mode inverting switch 333 when the main body rotates by a prescribed amount or to a certain angle. The male connector 343 can transfer the switching signal of the data input mode inverting switch 333 to the main body of the system 100.

When the user opens the system main body 100 around a first and second hinges 341 and 342 of the keyboard apparatus 300 by operating the keyboard opening/closing button 371, and rotates the main body 100 preferably about 180 degrees along the rotation direction of the keyboard disk assembly 332, projection 335a of the rotation detecting apparatus and the data input mode inverting switch 333 come in contact with each other. As a result, a switching signal is preferably generated. The switching signal is then sent to a control unit (not shown) of the main body 100 through the male connector 343. In conforming to the switching signal, the main body 100 of the system switches to the keyboard input mode so the user can input data by using the keyboard.

Preferably, stopping spring 335c is supported/secured (e.g., fastened) at two positions of the upper surface of the lower rotation guide member 334 to facilitate rotation of the keyboard assembly to 180 degrees. Each stopping spring 335c is fixated in such way as to maintain equal distance from the center of lower rotation guide member 334 (i.e., on the concentric circle) and maintains 180 degrees to each other. Also, a second projection 335b is formed on the rear surface of the keyboard disk 335 to oppose the stopping spring 335c fixated on the upper surface of the lower rotation guide member 334.

Operations of the stopping spring 335c and the second projection 335b will now be described. When the user rotates the main body at 180 degrees from the keyboard apparatus, the second projection 335b passes through the groove of the stopping spring 335c in accordance with the relative motion of the lower rotation guide member 334 and the keyboard disk 335 and can make a 'click' sound as it clicks to the groove. Therefore, the user does not stop rotating the keyboard apparatus 300 supporting the system 100 until he/she hears the click sound.

Figure 11:
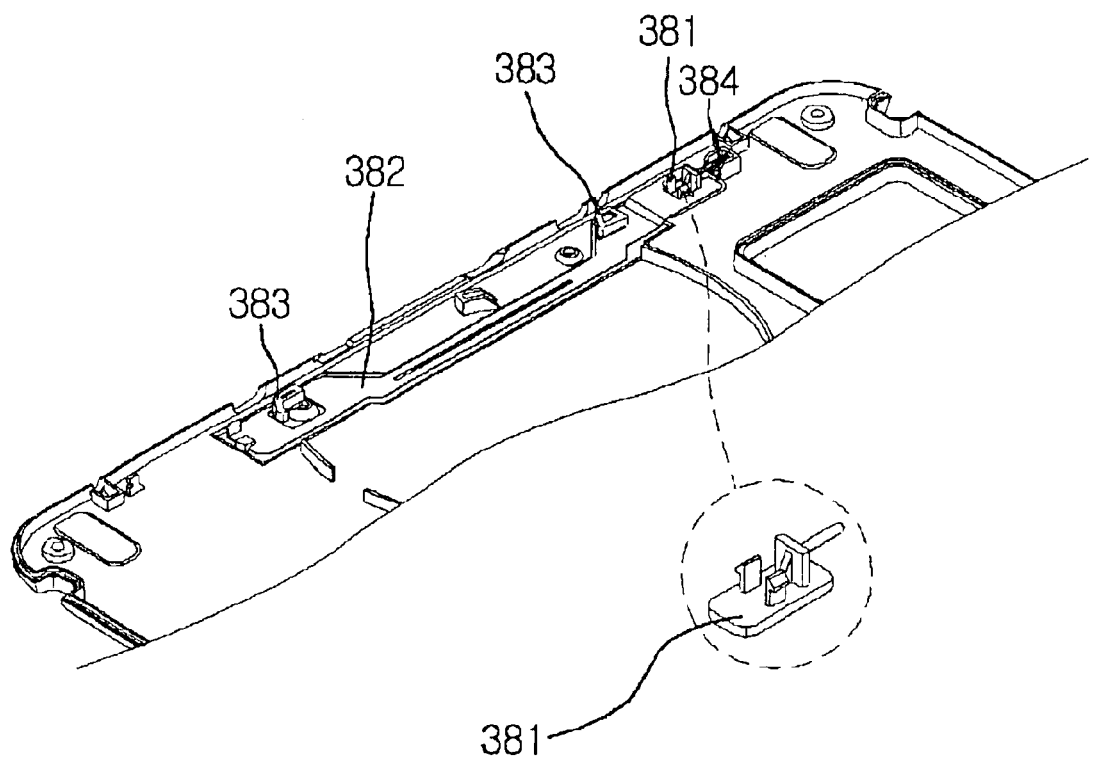
FIG. 11 is a diagram that shows a sectional perspective view of a protection cover detachment apparatus when a front case is partially cut off.

FIG. 11 is a diagram that shows a sectional perspective view of a protection cover detachment apparatus when a front case is partially removed. FIG. 12 is a diagram that shows detaching the protection cover.

The user can find it inconvenient to carry the multi-type computer system after coupling its main body to the keyboard apparatus. When coupled, the user must worry whether the main body, especially the display screen, will be damaged by being contacted with the outside.

To reduce or prevent any possible damage on the display surface of the main body, users can use a protection cover. More specifically, a protection cover detachment apparatus could be installed at the rear side of the keyboard case 310 to protect the display or glass surface on the main body 100 from external shock especially when the user needs to carry the folded computer system having system's main body 100 coupled to the keyboard apparatus 300.

The protection cover detachment apparatus can include a protection cover 385, protection cover detachment button 381 that slides over the rear case 312, a gearing lever 382 that gears by the protection cover detachment button and a catching button 383 with a catching surface to which the protection cover clicks, gearing with the gearing lever. The protection cover detachment button 381 can be resiliently supported by the return spring 384 so it tends or always returns to an original position after operation.

The cover protection detachment apparatus preferably attaches or clicks to the protection cover 385 to protect the glass surface of the display at the one side of the main body 100 from external shock. Therefore, if the user wants to carry the main body 100, he/she needs to insert a projection 386 on the protection cover 385 through the catching groove 315 that is formed on the keyboard case 310 to properly click the projection 386 to the catching button 383. On the contrary, if the user wants to take off the protection cover 385, he/she needs to push the protection cover detachment button 381 to the opposite direction, and releases the projection 386 from the catching button 383. At this time, if the user frees the catching button 383, the button preferably returns to its original position by the elasticity of the return spring 384.

Figure 13B:
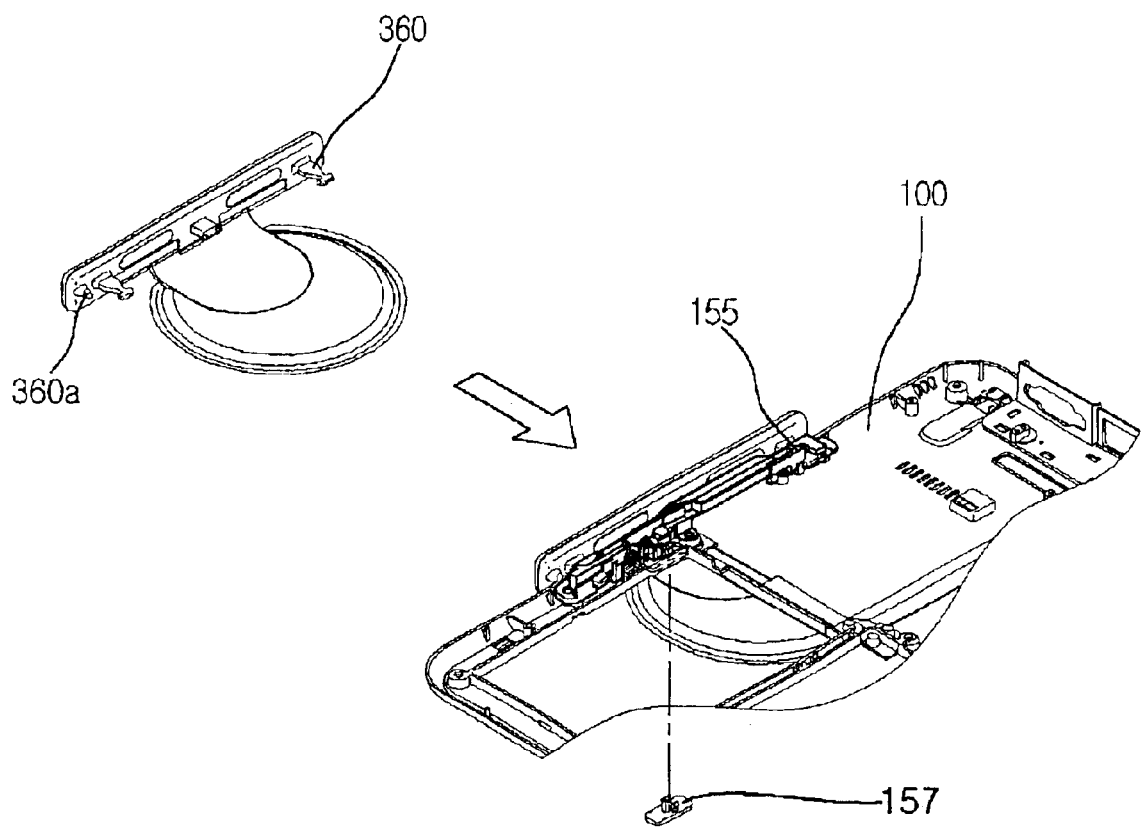

FIG. 13A and FIG. 13B are diagrams that show components and operations to couple the system's main body to the keyboard apparatus in forward and reverse directions in accordance with preferred embodiments. As shown in FIG. 13A, the display could be coupled to the system 100 to face the outside. Also shown in FIG. 13A, the system 100 can also be coupled the other way around, that is, the display could be coupled facing the keyboard apparatus, making its rear surface face the outside. The former is convenient in that users can input data directly in the display surface by using stylus pen and then see the input results. On the other hand, the latter has a merit in that users can keep the display surface from being damaged.

The forward/backward connection of the keyboard apparatus 300 to the main body 100 can be made, for example, by forming one or more projections on the end of keyboard docking projection 360 to work in both directions, thereby allowing the keyboard docking projection 360 to couple to the first frame in both directions. As shown in FIG. 13b, the keyboard docking projections 360 can work with the keyboard separating lever 157 of the main body in both directions. However, the present invention is not intended to be so limited.

For example, the connection of the system 100 to the keyboard apparatus 300 can be formed to allow only one single orientation. To connect the system 100 to the keyboard apparatus while keeping the display screen facing the outside, there should be a reverse-insertion preventing projection 360a at one side of the keyboard docking projection 360, and one passing groove at the opposite position of the reverse-insertion preventing projection should be formed at one side of the main body for the reverse-insertion preventing projection to pass through. In this case, if one assembles the system to make the rear side of the main body 100 face the outside, the reverse-insertion preventing projection can be interfered by a main body that does not have the passing groove for the reverse-insertion preventing projection. In this case, reverse-insertion assembly of the main body to the keyboard apparatus is made impossible, and reverse-insertion is prevented.

As described above, preferred embodiments of an attachable/detachable keyboard apparatus of portable multi-type computer system according to the present invention have various advantages that can be independently, partially, and in combination achieved. Preferred embodiments of an attachable/detachable keyboard apparatus of portable multi-type computer system according to the present invention can be used for a computer with web pad function and notebook PC function. Users can easily attach the keyboard apparatus to the main body of the system, and input text or data only when necessary. Further, the system can be used as web pad only with the keyboard detached from the system. In addition, the keyboard apparatus can be coupled and carried with the web pad folded together.

What is claimed is:

1. A system, comprising:
   a keyboard case;
   an input device exposed in an upper surface of the keyboard case; and
   a connector mounted on the keyboard case for connection to a portable computer, wherein the connector is configured to rotate between a first position and a second position, and wherein the input device is electronically disabled unless the connector is in the second position.

2. The system of claim 1, wherein the connector is configured to rotate in a plane substantially parallel with the upper surface of the keyboard case.

3. A system, comprising:
   a keyboard case comprising a front case and a rear case that are coupled together to enclose a space therebetween;
   an input device exposed in an upper surface of the keyboard case; and
   a connector mounted on the keyboard case for connection to a portable computer, wherein the connector is configured to rotate between a first position and a second position, and wherein the input device is disabled unless the connector is in the second position, wherein the connector comprises:
      a rotating member that is configured to rotate a web pad at a designated angle around the keyboard case being installed on an upper portion of the keyboard case;
      a male connector for connection of the input device to transmit signals that are outputted from the input device; and
      a keyboard docking projection at one side of the rotating member configured to secure the keyboard case to the web pad.

4. The system of claim 3, wherein the keyboard docking projection is configured to connect with first and second different orientations to the web pad.

5. A system, comprising:
   a keyboard case;
   an input device exposed in an upper surface of the keyboard case; and
   a connector mounted on the keyboard case for connection to a portable computer, wherein the connector is configured to rotate between a first position and a second position, and wherein the input device is disabled unless the connector is in the second position, wherein the connector comprises:
      a rotational disk that rotates around a fixed point relative to the upper surface of the keyboard case; and
      a hinge rigidly coupled to the rotational disk displaced a prescribed distanced from the fixed point.

6. A system, comprising:
   a keyboard case;
   an input device exposed in an upper surface of the keyboard case; and a connector mounted on the keyboard case for connection to a portable computer, wherein the connector is configured to rotate between a first position and a second position, and wherein the input device is disabled unless the connector is in the second position, wherein a sensor is configured to sense when the portable computer is coupled to the connector, wherein the first position is a closed position and a second position is an open position, and wherein the keypad is disabled based on the sensor.

7. A keyboard apparatus, comprising:
a keyboard case;
an input device exposed in an upper surface of the keyboard case;
a connector mounted on the keyboard case for detachable connection to a portable computer, wherein the connector comprises:
  a rotatable disk configured to rotate around a fixed point relative to the upper surface of the keyboard case; and
  a hinge rigidly coupled to the rotatable disk displaced a prescribed distanced from the fixed point.

8. The keyboard apparatus of claim 7, wherein the rotatable disk rotates between a first position and a second position, wherein the input device is disabled unless the rotational disk is in the second position, and wherein the connector is configured to align with an outer edge of the keyboard case in the first position and align with an edge of the input device in the second position.

9. The keyboard apparatus of claim 7, wherein the rotatable disk comprises:
  an upper rotation guide member coupled below the upper surface of the keyboard case;
  a keyboard disk assembly that rotates along a guide rail formed on a rear surface of the upper rotation guide member; and
  a lower rotation guide member fastened to the upper rotation guide member with the keyboard disk assembly therebetween, wherein the lower rotation guide member includes a data input mode switch at a designated position on a front surface.

10. The keyboard apparatus of claim 9, wherein the keyboard disk assembly comprises:
  a keyboard disk that rotates along the guide rail on the rear surface of the upper rotation guide member and includes a projection on a lower surface to selectively contact with the data input mode switch along the rotation between an open position and the closed position;
  a hinge frame that is fastened onto the keyboard disk; and
  a hinge assembly that rotates at a designated angle at one side of the hinge frame.

11. The keyboard apparatus of claim 10, wherein the hinge assembly comprises:
  a first connector cover;
  a second connector cover that is set up at an opposite side to the first connector cover;
  a first and second hinges separated by a prescribed distance and disposed between the first connector cover and the second connector cover, wherein the first and second covers are securely coupled together; and
  a hinge cover that fastens the first and second hinges onto the hinge frame while covering the first and second hinges.

12. The keyboard apparatus of claim 10, wherein the rotation of the connector causes the data input mode switch to convert the input device from a first mode to a second mode, wherein the input device is disabled in the first mode and enabled in the second mode.

13. A portable multi-type computer system, comprising:
a web pad-type computer; and
a keyboard apparatus that detachably connects to the web pad, wherein the keyboard apparatus comprises:
  a keyboard case having a front case and a rear case that are coupled together to enclose a space therebetween;
  a keypad exposed in an upper surface of the keyboard case; and
  a keyboard opening/closing apparatus mounted on the keyboard case that selectively rigidly attaches the web pad to the keyboard apparatus, wherein the keypad is disabled unless the keyboard opening/closing apparatus is in an open position.

14. The portable multi-type computer system of claim 13, wherein the keyboard opening/closing apparatus comprises a rotating member that comprises:
  a rotational disk that rotates around a fixed point relative to the upper surface of the keyboard case; and
  a hinge rigidly coupled to the rotational disk displaced a prescribed distanced from the fixed point.

15. The portable multi-type computer system of claim 13, wherein the keyboard opening/closing apparatus comprises a docking projection on one side of the keyboard opening/closing apparatus that secures the web pad to the keyboard opening/closing apparatus, wherein the web pad is rotatably attached by the docking projection to cover the keypad in a closed position with a first surface in a first orientation and to cover the keypad with a second surface in a second orientation.

16. The portable multi-type computer system of claim 15, wherein the web pad has a touch sensitive display unit for viewing information processed by the web pad exposed in the first surface, and wherein the display unit can be used to operate the web pad in the second orientation when the keyboard apparatus is in a closed position.

17. The portable multi-type computer system of claim 16, wherein the keypad is accessible in the open position and covered in the closed position, and a fastener locks the web pad to the keyboard apparatus in the both first and second orientation when in the closed position.

18. The portable multi-type computer system of claim 17, wherein the rotational disk comprises:
  an upper rotation guide member coupled to a rear surface of the front case;
  a keyboard disk assembly that rotates along a guide rail formed on a rear surface of the upper rotation guide member; and
  a lower rotation guide member fastened to the upper rotation guide member with the keyboard disk assembly therebetween, wherein the lower rotation guide member includes a data input mode switch at a designated position on a front surface.

19. The portable multi-type computer system of claim 18, wherein keyboard disk assembly comprises:
  a keyboard disk that rotates along the guide rail on the rear surface of the upper rotation guide member and includes a projection on a lower surface to selectively contact with the data input mode switch along the rotation between an open position and the closed position;

a hinge frame that is fastened onto the keyboard disk; and a hinge assembly that rotates at a designated angle at one side of the hinge frame.

20. The portable multi-type computer system of claim 19, wherein the hinge assembly comprises:

a first connector cover;

a second connector cover that is set up at an opposite side to the first connector cover;

a first and second hinges separated by a prescribed distance and disposed between the first connector cover and the second connector cover, wherein the first and second covers are securely coupled together at both ends thereof; and a hinge cover that fastens the first and second hinges onto the hinge frame while covering the first and second hinges.

* * * * *